United States Patent
Bowker et al.

[11] Patent Number: 5,963,657
[45] Date of Patent: Oct. 5, 1999

[54] ECONOMICAL SKIN-PATTERN-ACQUISITION AND ANALYSIS APPARATUS FOR ACCESS CONTROL; SYSTEMS CONTROLLED THEREBY

[75] Inventors: J. Kent Bowker, Essex, Mass.; Stephen G. Miller, Great Falls, Va.; Stephen C. Lubard, Woodland Hills; John M. Wartman, Malibu, both of Calif.; Clive Bolton, Melrose, Mass.

[73] Assignee: Arete Associates, Sherman Oaks, Calif.

[21] Appl. No.: 08/709,785

[22] Filed: Sep. 9, 1996

[51] Int. Cl.$^6$ .................................................. G06K 9/00
[52] U.S. Cl. ............................ 382/127; 382/124; 356/71; 340/825.34
[58] Field of Search ................... 382/115–117, 124–127; 356/71, 73; 348/156, 161; 340/825.3, 825.31, 825.34; 250/227.11, 227.2, 556; 235/379–382.5; 902/3–6

[56] References Cited

U.S. PATENT DOCUMENTS

| | | | |
|---|---|---|---|
| 4,811,414 | 3/1989 | Fishbine et al. | 382/272 |
| 5,416,573 | 5/1995 | Sartor, Jr. | 356/71 |
| 5,426,296 | 6/1995 | Shikai et al. | 250/556 |
| 5,467,403 | 11/1995 | Fishbine et al. | 382/116 |
| 5,619,586 | 4/1997 | Sibbald | 382/127 |
| 5,684,906 | 11/1997 | Sugawara | 385/120 |

*Primary Examiner*—Leo H. Boudreau
*Assistant Examiner*—Bhavesh Mehta
*Attorney, Agent, or Firm*—Ashen & Lippman

[57] ABSTRACT

Surface relief of a finger etc. is read using an optical-fiber prism unit, with fiber terminations at one end to contact the surface, and at the other for light passage along fibers from the first. Light enters where NA<0.5 and fiber diameter is constant with longitudinal position. The device is in a 1.4–2 L case, with a battery or power input, converter to form a corresponding data array for verifying, digital signal processor to do the verifying, and output to indicate or implement a decision. A video controller (with custom-programmed logic circuit) operates the sensors to develop the data array; an ADC digitizes the array; memory holds an authorized-user skin-pattern template, firmware for the processor, and data used in verifying; an output register holds the decision signal—all on a control, address, and data bus. High-power, radiative elements and a fast high-impedance data reader are on a common board in an isolating layout. The prism unit is cylindrical, held by a cylindrical-section cradle and forming a novel condenser lens to support lights and couple light to the prism. The imager has a cylindrical wall, transverse face for output of a skin pattern, and angled elliptical face to contact skin. To make many optical-fiber prisms each with one transverse and one angled face, transverse and angled cuts through a fused-fiber cylinder are alternated. The verifier can be within, and respond to the analysis to control, a door handle or lock: a hand need not move from reading position to open the door.

59 Claims, 25 Drawing Sheets

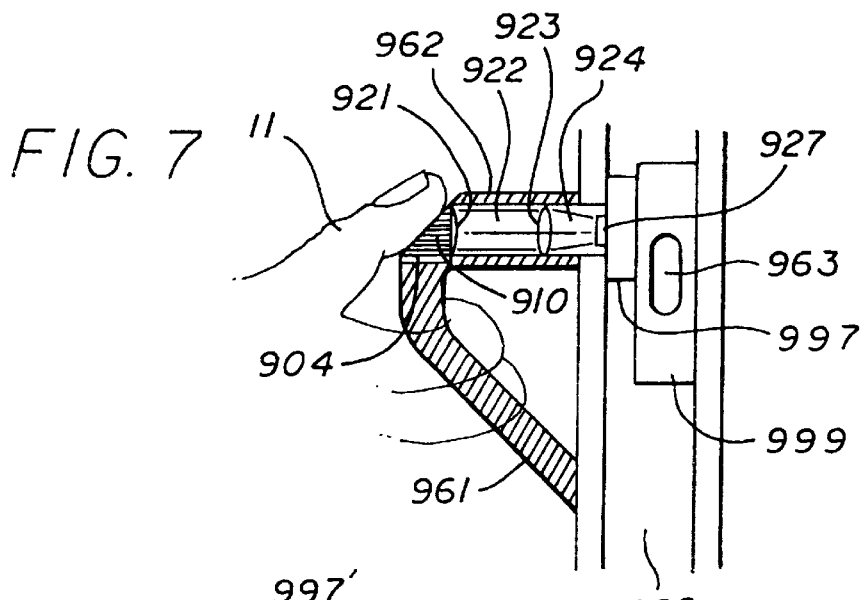
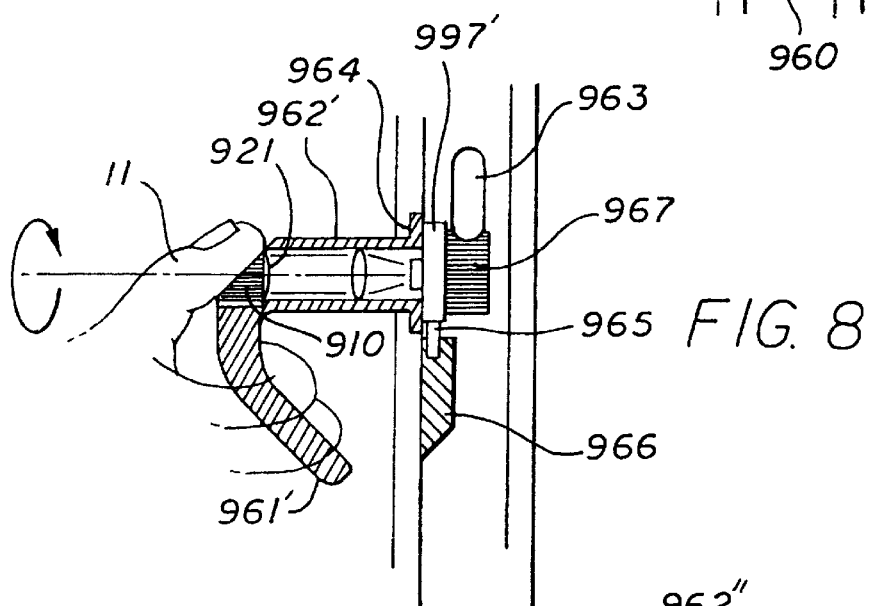
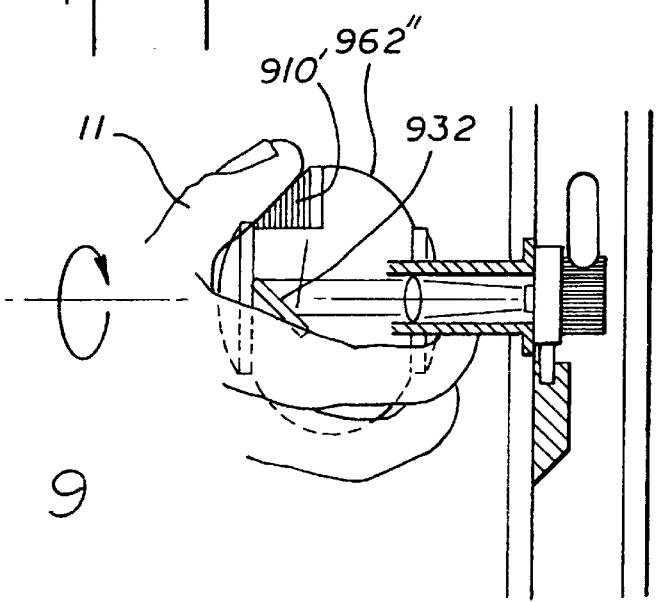

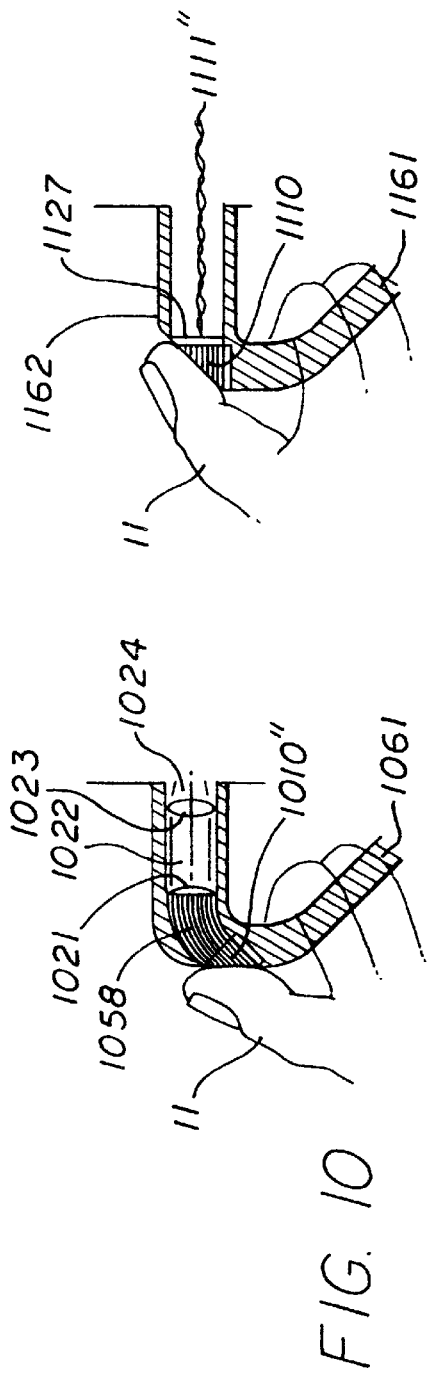
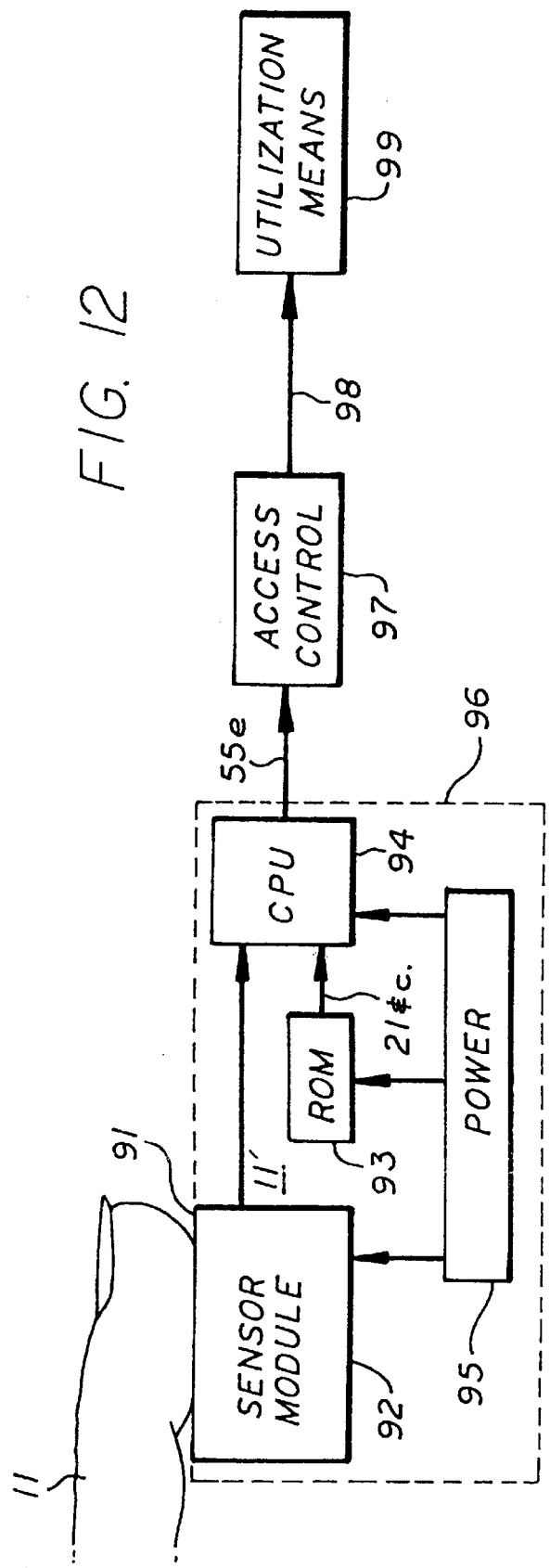

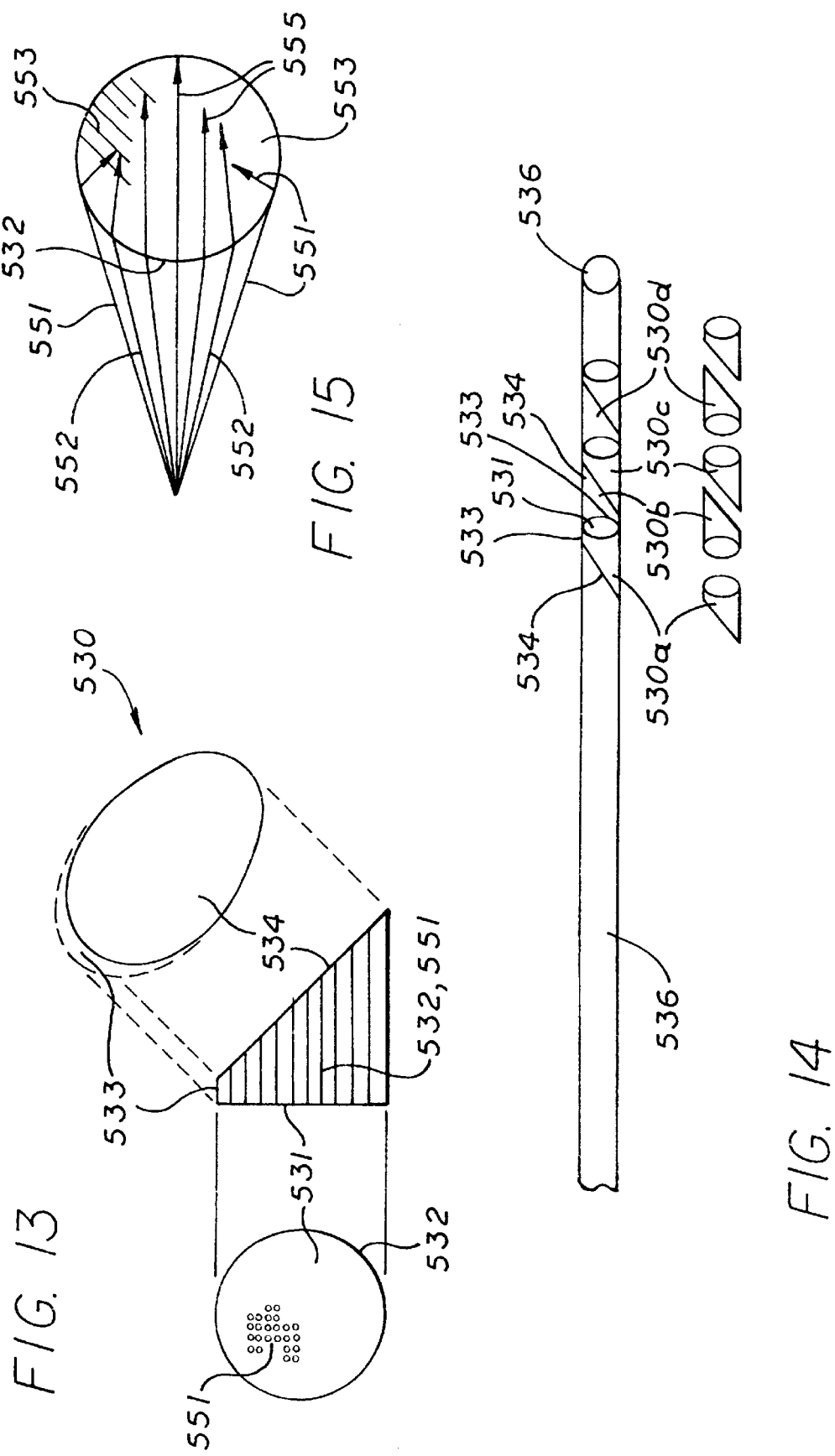

FIG. 30
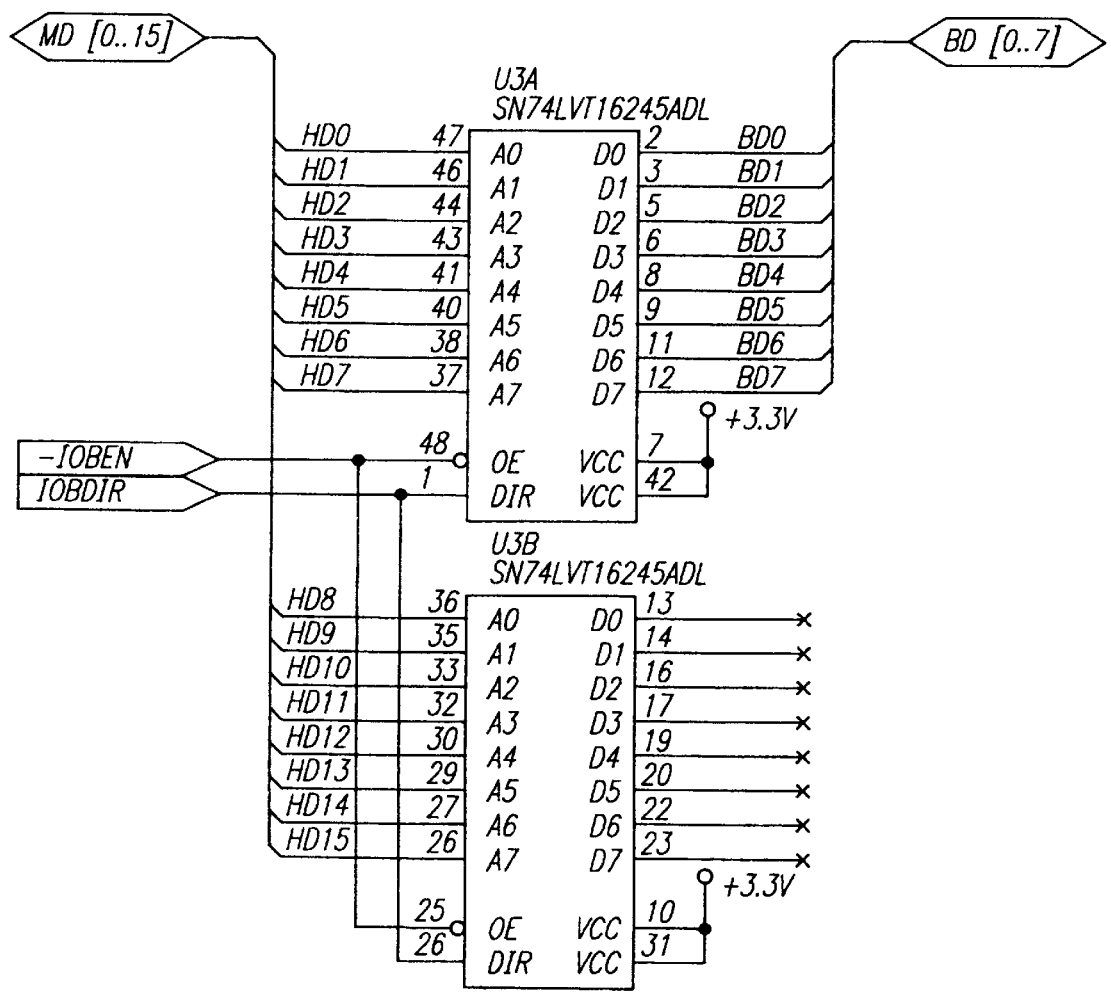
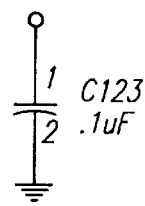
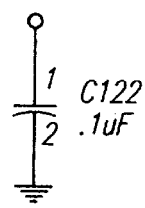
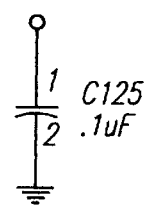
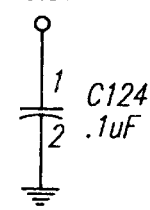

ECONOMICAL SKIN-PATTERN-ACQUISITION AND ANALYSIS APPARATUS FOR ACCESS CONTROL; SYSTEMS CONTROLLED THEREBY

RELATED APPLICATIONS

U.S. utility-patent application Ser. No. 08/382,220, filed Jan. 31, 1995, of J. Kent Bowker and Stephen C. Lubard, Ph. D., teaches and claims use of crosslit fiber-optic prisms in fingerprint-acquisition apparatus, and also teaches and claims several systems (including weapons) controlled or particularly suited for control by such apparatus. That application (hereinafter "Bowker") was issued on Sep. 22, 1998, as U.S. Pat. No. 5,812,252.

U.S. utility-patent application Ser. No. 08/709,302, filed Sep. 9, 1996, of Lawrence R. Thebaud, Ph. D., also identified as attorney docket xAA-11, teaches and claims apparatus and method for analyzing skin patterns and verifying identifications on the basis of such analysis.

Both of those applications are copending and commonly owned with this present document, and in their entirety are hereby incorporated by reference into this document.

FIELD OF THE INVENTION

This invention relates generally to automatic acquisition of skin-patterns (such as fingerprints), and other relieved-surface images, for access control—and to systems whose access is controlled by such automatic fingerprint etc. acquisition. The invention relates more particularly to fiber-optic prism systems for such fingerprint acquisition, and to cooperating mechanical and electrical provisions for both enhancing the identity confirmation and deterring circumvention of the identity confirmation.

Systems to which access is controlled in accordance with the present invention include personal weapons, other apparatus, facilities, financial services and information services.

BACKGROUND OF THE INVENTION

Very extensive discussion of the prior art appears in Bowker, mentioned above, and is earnestly commended to the attention of the reader. That discussion includes in particular a summary of previously known fingerprint techniques employing either frustrated total internal reflection (FTIR) or fiber-optic prisms. These topics will be only briefly summarized here.

FTIR technology—In FTIR work, a so-called "critical angle" establishes key angular relationships between incident light and light-collection directions, for so-called "bright field" and "dark field" systems. As explained at length in Bowker, the critical angle is defined either by arcsin (1/n) or by arcsin (n'/n), both special cases of Snell's Law in which n represents the refractive index of the solid material of an optical block.

The first expression applies when air is at the surface of the block; the second, when some other medium is juxtaposed against the block—in which case n' represents the refractive index of that other medium. Conventional FTIR fingerprint systems direct incident light to a block surface, from within the solid material, at an angle which is intermediate between the critical angles for air and for typical biological materials such as skin or flesh, and water.

If no finger is present, or if a finger is present but a light ray strikes the surface at a groove of the fingerprint, then the light under consideration is all internally reflected into the block, from which it can be detected by a suitably positioned sensor. If instead a light ray strikes the surface at a ridge of a fingerprint, then part of this light passes through the surface and into the material of the finger where it is scattered diffusely—a certain fraction reemerging from the finger into the block, from which it, too, can be detected by a suitably positioned sensor.

The two suitable positions are quite different, leading to two different operating modes: a "bright field" mode in which the sensor is positioned to capture internally reflected light at air-filled fingerprint grooves (creating a bright field against which fingerprint ridges appear as relatively dark stripes), and a "dark field" mode in which the sensor is positioned to avoid capturing internally reflected light (in which case fingerprint ridges appear as relatively bright stripes of scattered light, against a dark field).

Dark-field systems, as explained at length in Bowker, are generally preferred for their higher contrast—ease of distinguishing ridges from grooves—and also from considering the ratio of signal to noise. Dark-field contrast is generally about unity, but bright-field contrast can be as low as about $\frac{1}{7}$, with a proportionately lower signal-to-noise ratio. The only way to compensate in a bright-field system is to increase the exposure (that is, the light level or time, or their product) by about $7^2$=forty-nine times.

As also noted in Bowker, earlier FTIR systems require a focal element such as a lens to image the FTIR data onto a detector array or scanning detector—but a lens has undesirable properties including focal distances ranging (for practical cases of interest) from very roughly 7 cm, with no magnification or reduction, to over 10 cm if magnification or reduction is needed.

A lens system is also susceptible to depth of field and distortion, particularly severe if the lens and object plane are not reasonably parallel and conaxial—as is typical in bright-field devices. Such systems have different magnifications, and severely divergent focal positions, too, at top and bottom of the fingerprint image, leading to complications in later interpretation of the acquired image.

Prior-art fiber prisms—Also discussed in Bowker are two prior patents proposing substitution of a fiber-optic prism for a clear prism, as a dark-field FTIR fingerprint collection block in a fingerprint reader: U.S. Pat. Nos. 4,785,171 and 4,932,776 of Dowling et al. Those patents appear to include several misunderstandings of the physical phenomena involved, leading to configurations that are very inefficient and marginally operative.

In his first patent, Dowling retains a collection lens spaced from the prism face, and injects light into his system at this same output face of his fiber-optic prism. This configuration is very vulnerable to scattering of the bright incident light by contamination at the common input/output face.

Dowling's '776 second patent acknowledges this problem, and teaches use of a fiber-optic taper, integral with the fiber prism, to match the print image to a relatively small CCD array. It also teaches—instead of the spaced-lens configuration with injection and detection at the same end of the fiber-optic element—attaching a CCD array directly to the end of the fiber taper remote from the finger, thus entirely eliminating the lens and associated optical gap.

The fiber core has refractive index 1.62 and the cladding 1.48, yielding against air a moderately high numerical aperture NA=0.66 and critical angle of about 38°. This choice is conventional for obtaining good light-gathering power, although many skilled artisans in this field would prefer a considerably higher numerical aperture.

(For the majority of current applications involving fused-bundle faceplates or image conduits, glasses with numerical apertures of 1.0 and 0.66 are used. Fused-bundle materials are also available with a very few other numerical-aperture values such as 0.95, 0.85 and 0.35; however, 0.95 or 0.85 faceplate material is not always available, and 0.35 is typically run "infrequently due to lack of demand"—see for example "Fiber Optic Faceplate Data", Incom, Inc., Southbridge, Mass.).

Here Dowling sets out to apply the full capabilities of the tapered fiber prism to shorten the optical system, erect the image plane (supplying an image that is merely anamorphic but in uniform focus and free of major aberration), and eliminate or minimize effects of contamination and jarring. Unfortunately, however, Dowling's fiber prism is covered by a CCD at one end and a finger at the other, leaving no suitable entry point for illumination.

Dowling attacks this problem with three alternative tactics: transillumination of the fingertip, implanting lamps in the sensor end of the fiber prism, and directing light into the sides of the prism. It is shown in Bowker that all three suffer from major defects: very evident ones in the case of the first two tactics, and somewhat more subtle but still debilitating problems in the third.

As to the third tactic, illumination is specifically from the narrower sides of the taper—propagating toward the finger-contacting surface to be illuminated. In particular his illumination is directed into portions of the taper where fiber diameter is changing rapidly with respect to longitudinal position (i. e., the part of the taper that is actually tapered).

Analysis indicates that this Dowling system will at best work very poorly, and most likely not at all. In particular, the efficiency of light injection in this manner is extremely poor, and also would require a taper with no absorbing material outside the individual-fiber walls (usually designated "extramural absorbing" or "EMA" material)—thereby leading to severe fogging of the image.

If Dowling's apparatus has actually been made and operated, it must operate at the very bounds of usability—a power-hungry system working with small tail-end fragments of the input light that almost accidentally make their way to the fingerprint contact. It must have a low signal-to-noise ratio, due to massive diffusion of the backscattered light along the return path.

The fiber-prism systems of Bowker—Bowker describes a solution using optical-fiber prism means that are crosslit. The prism means may be simply an optical-fiber prism, or may be a combination of such a prism with other elements such as an optical-fiber taper.

Light enters the prism means in a region where the fiber diameters are substantially constant with respect to longitudinal position, for lighting the fiber terminations where a fingertip is applied. Such illumination is enabled by use of a fiber prism in which the numerical aperture (NA) is radically low—by any of several different measures.

The NA preferably does not exceed one-half, and even more preferably does not exceed 0.42, and a preferred value that is available commercially is 0.35—at least in the region where the light crosses the fibers. The constraint on NA is also expressed in terms of other parameters.

In certain circumstances the prism means, at least in a region where the light crosses the fibers, have a numerical aperture NA that satisfies this maximum condition:

$$NA \leq 2n_{avg}(D/x_F)^{1/4}, \quad \text{(Eq. 1)}$$

where $n_{avg}$=average of core and cladding refractive indices in that region of the prism means;

$D$=periodicity of the fiber structure in that same region; and $x_F$=illumination-path distance across the prism means in that region, and the conventional notation $(D/x_F)^{1/4}$ means the fourth root of the ratio $D/x_F$.

In other cases, particularly having opposed light sources to illuminate the fiber terminations from both sides of a square-cut-off prism, preferably the prism-means numerical aperture is small enough—at least where the light crosses the fibers—that the projected light which crosses the entire prism means, from each side, has at least one hundredth of the respective initial intensity.

Alternatively, at least in a region where the light crosses the fibers, the numerical aperture satisfies a modified form of Eq. (4), $$NA \leq 2n_{avg}(D/x_M)^{1/4}, \quad \text{(Eq. 2)}$$

where $x_M$=illumination-path distance across the prism means to the prism midplane, in the same region.

Forms and variants of the teachings in Bowker include both bright- and dark-field systems, in many different prism configurations. One aspect of those teachings includes illumination by means of a partial reflector at an end of the prism means.

Placing fiber-prism images on a sensor—In Bowker it is also taught that a sensor is advantageously mounted directly to the prism means—either directly to a primary prism that receives the fingertip whose pattern is to be analyzed, or directly to a fiber-optic taper that reduces the fingerprint image size for use with a much smaller sensor. These two forms of the sensor mounting taught in Bowker represent tradeoffs of the relatively high cost of sensors against the relatively high cost of tapers.

As pointed out in that document, the present price of even a relatively small detector if implemented as a conventional charge-coupled detector (CCD) array, is high enough to constitute the major cost element in apparatus according to the invention. A larger detector—the size of a fingerprint image—is prohibitively expensive for most applications.

This is the motivation for considering tapers even though a taper in turn disadvantageously adds to the weight, size and cost of the apparatus. At the time of writing of Bowker, however, the CCD cost advantage in provision of a taper in many cases was more than offset by the incremental cost of the taper—even without considering the weight and size penalty.

At that time, it was not possible to predict reliably whether eventual cost relief should be expected in the detector or in the taper, or in neither. Unfortunately at the present writing, more than a year and a half later, that situation has not changed.

Accordingly for most miniaturized applications the trade-off solutions taught in Bowker remain uneconomical. It is still anticipated that those solutions will in time become practical, as the price of conventional crystalline-silicon CCD arrays in this size range may fall—perhaps partially in response to competition for usage in apparatus according to the present invention—or an alternative optical detector, such as for instance a self-scanned diode ("SSD") array or thin-film (noncrystalline) photosensor arrays, may become available at significantly lower cost.

Meanwhile a practical package embodying the better-illuminated fiber-optic prism taught in Bowker has not appeared, heretofore.

Self-contained print verifiers—While many fingerprint analyzers are available in desktop or countertop modules, no prior art teaches a satisfactory fingerprint reading and analyzing apparatus that is self contained (which, for purposes of this document, is to be understood as meaning at least self contained except for power source). Such apparatus is a necessary first step toward real-time fingerprint verification systems operable within either hand weapons or other tightly constrained volumes such as mentioned below.

Extremely small, self-contained print verifiers present special challenges: extremely high optical, electronic and logical precision are required in a tiny but rugged system—at very low price. These challenges have not been adequately addressed in the art.

Data isolation and incompatibility—A special problem of such self-contained systems is how to make the greatest use of data. This issue arises because system operations include taking original data, both from authorized users and candidate users.

In either of these cases, information about the fingerprint that has been read by the apparatus may later be needed or desirable for other purposes. Such use was previously suggested in connection with anamorphism in the data.

First, where a home or business has many locks, it may be desirable to take authorized-user data just once—using just one of the locks—and then electronically copy the information into all the others. Second, law-enforcement agencies may have a particular use for such data.

This latter situation may arise for example when a facility has been entered forcibly and there is reason to believe that the intruder first attempted to operate the fingerprint-controlled lock. It may also arise when a person who has been an authorized user steals from the controlled facility, or commits some other crime—whether there or elsewhere. Other possibilities arise when an authorized user, for example a missing child, is not likely to have been otherwise fingerprinted.

Data export can be a problem in particular when a system operates using multilevel data, or using data in a special form such as sinusoidal or Fourier-transform data—as is the case for instance with Thebaud's, mentioned previously. Exporting such data may not be useful if the receiving application (such as law enforcement) that could use the underlying information operates on data in more-conventional formats.

Door applications—While addressed broadly to many applications of a fingerprint reading device, Bowker gives particular attention to the configurations suited for use in guarding a weapon—particularly a small hand weapon. Mainly because of the cost considerations discussed above, hand-weapon applications appear to remain for the present just slightly beyond the range of economic development in commercial exploitation.

A market that is much more practical in view of the apparatus sizes that can be installed, and also taking into the number of now-unguarded units in use, is the protection of doors—and more particularly door handles. Although still small, a typical door handle and its associated lock have (at least potentially) several times greater volume for installation of security equipment than does a typical hand weapon.

Accordingly it is believed that the prior art has not adequately attended the opportunities for optical skin-pattern readers in direct association with doors, door handles and doorknobs.

Numerical aperture of tapers—In Bowker it is taught that a taper used in the invention should be of relatively very high NA, certainly well over 0.5, to compensate for the intrinsic degradation in light-transmitting power associated with the image-reduction capabilities of a taper—and thereby allow transmission of enough optical energy to match the main part of the prism. The degradation is proportional to the square of the reduction; thus for example it is said that a two-times reducing taper should have $NA \geq 0.66$, a three-times taper $NA \geq 1.05$, and a four-times taper $NA \geq 1.4$, in conjunction with a main-prism NA of 0.35.

This teaching, however, has since been recognized as partly in error. If a high-NA taper is employed to receive the optical image signal from a low-NA main prism (at least if this is done without special precautions), longitudinally diffusing stray light in the prism section can enter the taper. Such diffusing stray light arises, at the fingertip-contacting end face of the prism, from the excitation illumination which is reflected by that end face at steep angles relative to the fiber axes.

If the main prism is short, this adverse effect is aggravated—because the longitudinally diffusing stray light does not have adequate longitudinal diffusion distance in which to escape from the system, before reaching the taper. Since a high-NA taper by definition has high ducting capability, the stray light even though angled steeply—beyond the ducting range of the main prism—once into the taper is all carried to the sensor.

Such a result is undesirable because the diffusing stray light is uncorrelated with the signal in each fiber, and so badly fogs the image. The stray light can be quite bright, particularly in dark-field cases where it arises from the specularly reflected, unmonitored bright background.

Therefore new measures are needed to accommodate the poor optical signal-to-noise phenomena associated with feeding a high-NA taper from a short, low-NA main prism.

Applications—More generally the art has not heretofore provided an economical optical fingerprint reader module that is amenable to microminiaturization for access control in highly demanding field applications, particularly including common doors and door handles as well as personal weapons—and also encompassing access to use of portable computers and phones.

Time-and-attendance systems, database access systems, public phones, phone credit systems, vehicles, automatic tellers and facility-entry access devices, although not as critical as portable personal equipment or self-contained door-handle systems in terms of size, time, power, identification certainty, etc. would also be meaningfully enhanced by provision of a self-contained microminiaturized reader.

As now seen, the art has not yet provided solutions to important problems; and important aspects of the technology in the field of the invention are amenable to useful refinement.

SUMMARY OF THE DISCLOSURE

The present invention introduces such refinement, and corrects the failings of the prior art. Before offering a relatively rigorous discussion of the present invention, some informal orientation will be provided here.

1. ORIENTATION

It is to be understood that these first comments are not intended as a statement of the invention. They are simply in the nature of insights that will be helpful in recognizing the underlying character of the prior-art problems discussed above (such insights are considered to be a part of the inventive contribution associated with the present invention)—or in comprehending the underlying principles upon which the invention is based.

The system described in Dowling '776 is inoperative, or marginally operative, for these four main reasons—discussed at considerably greater length in Bowker:

(a) Light should be injected at a favorable place—Illumination should be injected so that it passes through the side wall immediately adjacent to the end-surface terminations. Light should not rely on passage ductwise along the fiber, but instead directly strike terminations immediately after passage through the side wall—with no ducting reflections.

This principle applies whether the terminations under consideration are those which contact fingertips or are partial reflectors at an opposite end of the prism means. The Dowling '776 system departs from this requirement.

(b) Light should be injected at a favorable angle—The illumination should first enter each fiber:

at the proper angle for FTIR operation (or reflection, as the case may be) at the fiber termination; and at an angle to the fiber which is not favorable to direct entry of the rays into a ducting mode.

Dowling's teaching of injection at "30° to 45° relative to [the] major longitudinal axis" is ambiguous as to the first of these requirements, for he seems to state the angle outside the prism, not inside—and the effective incidence angle at the fingertip-contacting surface is hard to divine from the information he provides. He does, however, make plain his objective of initial ducting for injected light, directly contradictory to the second condition stated here.

(c) The fiber prism should be of a favorable material—To avoid effective attenuation of FTIR-usable illumination, and nonuniformity of illumination across the field, and also associated image fogging and light loss, it is essential to choose fiber-prism material of suitable numerical aperture NA. Attenuation length for diffusion across a fiber prism varies, roughly, inversely with the fourth power of the NA.

The attenuation length $(2n_{avg}/NA)^4 D/2$ establishes the rate at which FTIR-usable intensity falls off with penetration depth. (Here $n_{avg}$ is the average of the core and cladding refractive indices in the crosslighting region of the prism, and D the periodicity of the fiber structure in the same region.)

Using this very approximate relation, attenuation length can be estimated at very roughly 2 mm for NA=0.66, or 21 mm for NA=0.35. Ability to effectively crosslight a prism thus depends very strongly on selection of a material with suitably low numerical aperture.

This is so, as shown in Bowker, whether light is injected from both sides of a prism or only one, and whether in dark- or bright-field mode. Effective lighting, even if from two sides, is infeasible at Dowling's indicated NA=0.66: only the tiniest fraction of incident energy is available for good FTIR operation, even halfway across the fiber prism, and nonuniformity amounts to a factor of about five thousand between the extreme values.

Low NA, however, readily yields astonishingly high FTIR-usable intensity at a midplane and uniformity good within a factor of 1.4 across the full breadth of the prism means. Comparably excellent results arise with unidirectional lighting.

In addition, at least the injection segment of the prism should be free of extramural-absorption material.

(d) If a taper is used, it should be a separate element from the prism—Whereas the prism should have low NA to minimize attenuation, and should be free of EMA material, two opposite considerations apply to the taper.

To constrain light within its waveguiding boundaries and minimize crosstalk, and also to match energy flow through the main prism, as mentioned earlier the taper should have high NA and should include EMA material. Since the prism and taper thus have diametrically conflicting design requirements for practice of the present invention, they are best fabricated as separate elements.

In addition to the above-listed four considerations relative to Dowling, the present document introduces these further new developments relative to the teachings in Bowker:

(e) Focal elements to relay image from prism to sensor—For the present, in view of the adverse economics both of sensors and of tapers, an interim solution is needed. Whereas one ideal would be a low-resolution CCD-like element, meanwhile we prefer to use a focal system—preferably two lenses, or two mirrors.

None of these is fully satisfactory, but such solutions are currently preferred to a sensor or taper. It is contemplated that, for higher volume manufacture of the invention in the future, custom sensors may become available.

(f) Template abstracting for storage, input to or output from self-contained reader—Some utilization means inherently serve a small number of authorized users, for example just one or two. Representative examples include a personal weapon, personal computer or vehicle, etc. For this case a correspondingly small number of templates are to be stored, and it may be best to store them in fully ready-to-use form—with as much preprocessing as possible done in advance to minimize decision-making time.

Where multiple users—for example, a hundred—must be accommodated, however, and slight added decisional delay can be tolerated, it is preferable to minimize storage or data-transmission costs by placing templates in abstracted form such as binary or trinary form (one- or two-bit data). In such situations it is desirable to prefilter, smooth and normalize the data before such preparation for storage or transmission—to be certain that the level-downsampling process does not settle upon nonrepresentative data points.

Similarly after data are recovered from storage, or received by transmission from an external source—assuming that in the actual verification processing the data are used in multilevel form—the data should be refiltered and smoothed, to eliminate spurious abrupt changes (high-spatial-frequency components) in the image.

These considerations apply whether the mode of loading data into the apparatus is to retrieve the data from storage, or read them in from a remote data bank, or read them in from (for example) an identification card carried by the candidate user. In the latter case, the data might be held in a magnetic strip or two-dimensional bar code, or in other ways.

The overall decision as to data formatting for storage (or transmission) depends upon the balance between urgency of decision, as for example in the weaponry case, and cost of storage or data transmission. In a great majority of present applications, transmission and storage are the more-limiting considerations.

(g) Mechanical system for self-contained reader—Representative prior systems occupy housings well in excess of four liters. The present invention, however, combines extraordinarily compact optical, mechanical and electronic subsystems that enable overall reduction to well under two liters.

In the now-preferred embodiment the total system volume, excepting only an external power connection when used, amounts to less than 1400 cubic centimeters. The optomechanical aspects of this achievement call for an optical bench that is unusually compact but without compromise of decisional accuracy—and that is well integrated with the electronics.

In addition the optomechanical system uses a novel fiberoptic prism that is cylindrical, with light-transmitting input and output surfaces essentially at forty-five and ninety degrees to the longitudinal axis of the cylinder (i. e., the socalled "cylindrical axis"). These prisms are fabricated very economically, cut as a series of opposed units from a common optical-fiber cylindrical rod.

(h) Electronic system for self-contained reader—The system uses extremely intensive data processing that is able to make use of essentially all the skin-pattern information that can be collected. This requires a very large, high electrical-power processor, and for most effective use of modern componentry this in turn requires high-power switching-type power supplies.

Such a processor, and such power supplies, radiate electromagnetic interference copiously. Commonly such situations are approached by incorporating physical shielding, massive signal filtering, and placement of components on different boards to isolate them.

In the present invention, however, these components must share a very small housing with an extremely sensitive, high-impedance detector—and with other components which effect data transfer from that detector into the processing circuits at bit-transfer rates of multiple megahertz. Such signal bandwidths are comparable to those of the radiated noise, effectively obviating the option of front-end signal filtering. Furthermore space and weight objectives preclude conventional shielding.

These onerous obstacles have been overcome by an ingenious layout of all the components on a common surface-mount circuit board that minimizes their interaction and enables excellent operation without separate boards, shielding or filtering. The most troublesome component interactions are avoided by placing the components involved—the power supplies and the sensor—at opposite corners of the board.

(i) Doorway access control—Although weaponry applications are exceedingly interesting and of course have a certain glamour, it has been observed that the world contains many more doors than handguns. Therefore in a sense the door market is much more important.

In this regard, the present invention introduces new ways of marrying fingerprint-reading modules with door handles and doorknobs, so that the combination natural and easy—in other words, ergonomic—to use.

2. MORE-FORMAL DISCUSSION

Now with these preliminary observations in mind this discussion will proceed to a perhaps more-formal summary. The invention has several independent aspects or facets.

(a) A FIRST ASPECT of the invention—In preferred embodiments of a first of these aspects, the present invention is apparatus for acquiring surface-relief data from a relieved surface such as a finger.

The apparatus includes prism means formed from optical fibers. (A fused bundle of fibers is much preferred to unfused fibers, as the latter—with their high-index-differential boundaries between glass and air—attenuate crosslighting much more rapidly.) The prism means in turn include a first end and a second end.

As will be seen, the phrase "prism means" is primarily used to encompass important embodiments of the invention in which two or more fiber-optic optical elements in series are included in the optical assembly.

The first end comprises terminations of the fibers for contact with the relieved surface. The second end comprises opposite terminations of the same or corresponding fibers.

By "corresponding fibers" here is meant fibers of a second element that may be in series, as mentioned just above. Such a fiber receives light from the fibers in the first element.

A "corresponding fiber" typically is only very roughly aligned with any of the fibers in the first element, so that in practice the light from each fiber in the first element may pass into several fibers of the second—and each fiber of the second element typically receives light from several fibers of the first. These effects somewhat degrade image resolution, but can be made inconsequential by using prism materials in which the fiber spacing is sufficiently finer than the fingerprint ridge spacing.

The second end of the prism means is for passage of light traveling along the fibers from the first end.

Preferred apparatus according to the first aspect of the invention also includes means for projecting light across the fibers in a region where fiber diameter is substantially constant with respect to longitudinal position, for lighting the first-end terminations. For breadth and generality in discussing the invention, these means will be called the "light-projecting means" or simply "projecting means".

Even though the projected light crosses the fibers and is "for illuminating" their first-end terminations, in some forms of the invention as will be seen it does not necessarily illuminate them directly or immediately upon fiber entry.

A light fraction that is dependent (i. e., whose magnitude is dependent) on contact between the relieved surface and each illuminated first-end termination is ducted from that termination along its fiber. (By "its fiber" is meant the fiber which is terminated by the termination.)

The present invention enables such passage of light, to and from the finger-contacting end of the prism means, to proceed successfully according to the well-known principles of FTIR introduced earlier in this document—despite use of fiber-optic prism means.

In addition the apparatus includes some means for receiving—at the prism-means second end—each light fraction from the first end, and in response forming an electrical signal which is characteristic of the surface relief. Such means accordingly have an electrooptical character; here too for generality and breadth these means will be called simply the "electrooptical means".

The apparatus further includes focal means for relaying each light fraction at the second end to the electrooptical means. The phrase "focal means" encompasses one or more lenses, one or more mirrors, or combinations of these.

The foregoing may be a description or definition of the first aspect of the present invention in its broadest or most general terms. Even in such general or broad forms, however, as can now be seen the invention resolves the previously outlined problems of the prior art.

In particular, because the light is injected in a region of the prism means where fiber diameter is substantially constant with longitudinal position—rather than in the changing-diameter region of a taper—this invention avoids the severe inefficiency (and at least marginal inoperability) of the Dowling '776 system.

By avoiding injection into a tapered region, the present system enables illumination to reach crosswise, without being ducted through the fibers, to the fibers whose terminations are to be lighted. In fact the light can directly reach either (1) those terminations or (2) certain other terminations which reflect light directly along the fibers toward those finger-contacting terminations.

This is a far more systematic, controlled, efficient optical-energy coupling arrangement. Furthermore, because of the selection of an untapered region for light injection, the light can be projected crosswise into the prism directly toward the optical-interaction points (or directly toward reflection sites whence it is in turn projected directly longitudinally toward the optical-interaction points). In consequence, essentially all the light which reaches the first-end terminations can satisfy FTIR requirements.

This invention accordingly avoids the catch-as-catch-can energy usage which can result (as for example in Dowling '776) from illumination that is haphazard with respect to the relationships of frustrated total internal reflection.

Use of focal elements enables enjoyment of the crosslit fiber-prism benefits without the cost penalty of a taper or a large CCD.

Although the invention thus provides very significant advances relative to the prior art, nevertheless for greatest enjoyment of the benefits of the invention it is preferably practiced in conjunction with certain other features or characteristics which enhance its benefits. Among these are preferred embodiments including bright-and dark-field configurations such as described at very great length and in very great detail in Bowker—but now with focal means included.

(b) SECOND through SIXTH ASPECTS of the invention—All of the foregoing summary of the invention has been presented in terms of the first main facet or aspect of the invention. In second through sixth such aspects, the invention is related to the first—but these forms of the invention, discussed in this section (b), are not necessarily limited to injection of light into a region where fiber diameter is substantially constant along the fibers.

In this second aspect of the invention, however, an angled partial reflector intercepts light projected in through a prism input face. The reflector redirects that light to illuminate the fiber terminations at the data-input (finger contacting) face.

In a third aspect of the invention, the numerical aperture is constrained to not exceed the value found from Eq. (1) or (2)—depending on whether illumination is projected through one side face or more than one.

In a fourth of its facets or aspects, the invention is related to the third aspect—but the numerical aperture, rather than being defined by Eq. (1) or (2), does not exceed one-half.

In a fifth of its facets or aspects, too, the invention is related to the second and third aspects—but the numerical aperture, rather than being defined by Eq. (1) or (2), is defined more stringently by a like equation but with an inserted factor of 2 in the denominator of the fourth-rooted function.

In a sixth of its facets or aspects the invention is like-wise related to the second and third aspects, but the numerical aperture is defined more stringently as not exceeding 0.42.

(c) A SEVENTH ASPECT of the invention—In a seventh aspect or facet, the invention is apparatus for acquiring and using surface-relief data, from a relieved surface such as a finger, for controlling access to facilities, equipment, a financial service or information.

This apparatus includes in its entirety the first aspect of the invention—in other words, the above-discussed apparatus for acquiring surface-relief data from a relieved surface such as a finger. Here, however, the electrooptical means have enlarged functions.

In this case they not only receive at the second end of the prism means the light fractionally directed into the fibers at the first end, and process the received light to determine identity of the relieved surface, but in addition the electrooptical means apply the determined identity to control access to the facilities, equipment, financial service or information.

(d) AN EIGHTH ASPECT of the invention—In still an eighth of its major aspects, the invention is a secured system subject to access control based upon surface-relief data from a relieved surface such as a finger.

This system includes utilization means, susceptible to misuse in the absence of a particular relieved surface that is related to an authorized user. These utilization means are a facility, an apparatus, some means for providing a financial service, or some means for providing information.

In addition this system of the eighth aspect of the invention includes in its entirety the data-acquiring-and-using apparatus according to the seventh aspect of the invention, as set forth just above. Here the electrooptical means apply the determined identity to control access to the utilization means which are part of this system.

(e) A NINTH ASPECT of the invention—Here in its preferred embodiments the invention is self-contained apparatus for skin-pattern verification. The apparatus includes a case having volume less than about two liters (one hundred twenty cubic inches).

Mounted within or for access at the surface of the case are all the following elements;

means for holding an electrical-energy storage device or for receiving electrical power from an external source, to power the apparatus;

means for contacting a skin pattern to develop an electronic data array corresponding to an image of the skin pattern;

means for generating in response a corresponding electronic data array for use in verification;

means for performing a verification procedure;

output means for indicating or effectuating, or both, a verification decision;

means for formatting the data array in a compact form for use in storage, import or export; and means for converting the data array from said compact form to a different form for use by the verification-procedure performing means.

(f) A TENTH ASPECT of the invention—In this regard, the invention in its preferred embodiments is self-contained apparatus for skin-pattern verification. The apparatus includes a case having volume less than about two liters. Mounted within or for access at the surface of the case are all the following elements;

means for holding an electrical-energy storage device or for receiving electrical power from an external source, to power the apparatus;

means, including an imaging unit and a sensor array disposed to receive an image therefrom, for contacting a skin pattern to develop an electronic data array corresponding to an image of the skin pattern;

a video controller for controlling the sensor array to develop said electronic data array;

an analog-to-digital converter for digitizing the electronic data array;

a digital signal processor for performing verification procedures based upon the electronic data array, and for developing a decision signal based upon the verification procedures;

memory means for holding an authorized-user skin-pattern template, program firmware for the digital signal processor, and data used in the verification procedures;

an output register for holding the decision signal;

output means for transmitting a utilization-means switching signal, based on the decision signal, from the apparatus for effectuation of the decision signal; and a control, address, and data bus interconnecting the video controller, analog-to-digital converter, video processor, memory means, and output register.

(g) AN ELEVENTH ASPECT of the invention—The invention in preferred embodiments of its eleventh aspect is self-contained apparatus for skin-pattern verification. The apparatus includes a case having volume less than about two liters.

Mounted within or for access at the surface of the case are all the following elements:

- means for holding an electrical-energy storage device or for receiving electrical power from an external source, to power the apparatus;
- an optical bench disposed within or forming part of, or both, the case;
- optical-fiber prism means mounted to the optical-bench bosses for contacting a skin pattern to develop an image thereof;
- an objective lens mounted to the optical-bench ring for relaying the skin-pattern image to a sensor array;
- a sensor array mounted to the optical-bench pocket for receiving said image and in response developing an electronic data array corresponding to the image;
- a surface-mount electronics board holding a digital signal-processing chip for analyzing the data array to verify identity corresponding to such skin pattern; and
- verification-decision indicating or effectuating means, or both.

The optical bench has mounting bosses for optical-fiber prism means. The bench also has a mounting ring for an objective lens, and a mounting pocket for a sensor array.

(h) A TWELFTH ASPECT of the invention—In preferred embodiments of this aspect, the invention is an optical-fiber imager for use in a skin-pattern analyzer. The imager includes an optical-fiber prism.

The prism in turn has a cylindrical wall defining a longitudinal axis. It also has fused optical fibers parallel to the longitudinal axis, and a transverse face for output of a skin-pattern image from the prism.

In addition the prism has a generally elliptical, angled face for contacting a skin pattern.

(i) A THIRTEENTH ASPECT of the invention—As to this aspect of the invention, preferred embodiments take the form of a condenser lens for use with an optical-fiber prism in a skin-pattern imager. The condenser includes a convex, generally cylindrical-section surface of a first radius for receiving illumination.

It also includes a concave, generally cylindrical-section surface of a second radius, smaller than the first. This concave surface is for holding the optical-fiber prism and for transferring illumination into the optical-fiber prism.

The phrase "cylindrical-section surface" means a surface that has the form of a section of a cylinder. For example the concave surface preferably is about a half of a cylinder—i.e., a cylinder cut in half longitudinally by a diametral plane parallel to the longitudinal axis of the cylinder.

The convex surface, however, preferably is less than a half cylinder.

(j) A FOURTEENTH ASPECT of the invention—In preferred embodiments of this aspect, the invention is, in combination, a door handle and lock set for installation in a door. The door handle and lock set, considered together, hold a self-contained skin-pattern-verification apparatus.

The combination includes a lock for mounting in the door, and a handle, interfitted with the lock, for manual operation to open the door. Wholly contained within the lock and handle is apparatus for acquiring surface-relief data from a relieved surface such as a finger.

The apparatus includes prism means formed from optical fibers. The prism means have a skin-pattern contact surface exposed at the exterior of the lock or handle. The apparatus also includes an electrooptical sensor disposed for receiving an image of a skin pattern through the prism means.

In addition the apparatus includes means for analyzing the skin-pattern image to verify identity based on the skin pattern. The apparatus also includes means, responsive to the analyzing means, for controlling operation of the lock or handle, or both.

All of the foregoing operational principles and advantages of the present invention will be more fully appreciated upon consideration of the following detailed description, with reference to the appended drawings, of which:

BRIEF DESCRIPTION OF THE DRAWINGS

FIGS. 1 through 5 are conceptual elevations showing fiber-optic prism configurations with focal-elements relaying an image from the prism to a detector array, for several preferred embodiments of the invention—of which:

FIG. 1 is a bright-field system for use with a thumb or other digit oriented in one direction, FIG. 2 is a like system for use with a thumb oriented oppositely, FIG. 3 is a like system with a stepdown-coupling prism that reduces the image in one direction, FIG. 4 is a bidirectionally illuminated dark-field system, and FIG. 5 is a dark-field system illuminated with a partial reflector;

FIGS. 7 through 11 are elevations in longitudinal section showing fiber-optic prisms built into several door-and-door-handle configurations, of which:

FIG. 7 is a fixed door handle,

FIG. 8 is a rotatable door handle,

FIG. 9 is a like handle configured as a doorknob,

FIG. 10 is a view like FIG. 8 but with an alternative fiber-prism installation, and FIG. 11 is a like view but with a further alternative fiber-prism installation;

FIG. 12 is an overall system block diagram;

FIGS. 13 through 21 relate to optical-prism fabrication, illumination coupling and mounting, of which:

FIG. 13 is a group of complementary orthographic views (end, side, and forty-five-degree-face) of a cylindrical, optical-fiber prism, FIG. 14 is a rough conceptual side elevation of an optical-fiber rod, taken from a point of view at the side but partly toward one end of the rod, and showing extraction of multiple prisms like FIG. 13 with little waste, FIG. 15 is an end elevation of the FIG. 13 prism conceptually showing illumination of the prism and an undesired shadowing phenomenon, FIG. 16 is a ray-trace diagram like FIG. 15 but enlarged and much more precise, and showing operation of a high-quality condenser lens, fitted to the prism, FIG. 17 is a like view showing operation but for a very inexpensive condenser lens, FIG. 18 is a forty-five-degree view of the FIG. 13 cylindrical prism, oriented like the upper-right view in FIG. 13—but enlarged and showing from a different vantage the shadowing phenomenon of FIG. 15, FIG. 19 is an end elevation (oriented like the left-hand view of FIG. 13) of the FIG. 17 condenser, and;

FIG. 20 is a side elevation (rotated ninety degrees clockwise relative to the central view of FIG. 13) of the same condenser;

FIG. 21 is a top plan of the same condenser;

FIGS. 23 through 31 are electronic schematics, of which:

FIG. 23 is a top-level schematic,

FIG. 24 shows 3.3-volt and 5-volt power supplies,

FIG. 25 shows a clock generator,

FIG. 26 shows a microprocessor and buffer,

FIG. 27 shows a GLUE PLD,

FIG. 28 shows data buffers,

FIG. 29 shows a dynamic memory,

FIG. 30 shows peripheral data buffers, and

FIG. 31 shows an EPROM and flash memory; and FIGS. 32 through 34 are mechanical layouts, of which:

FIG. 32 is an isometric sketch taken from above and to left front of the device, with the case drawn in as if transparent to show the relationships of the internal modules with the case;

FIG. 33 is a right elevation of the unit, taken from just inside the right wall of the case, and FIG. 34 is a left elevation of the optical bench.

DETAILED DESCRIPTION OF THE PREFERRED EMBODIMENTS

Figure 1:
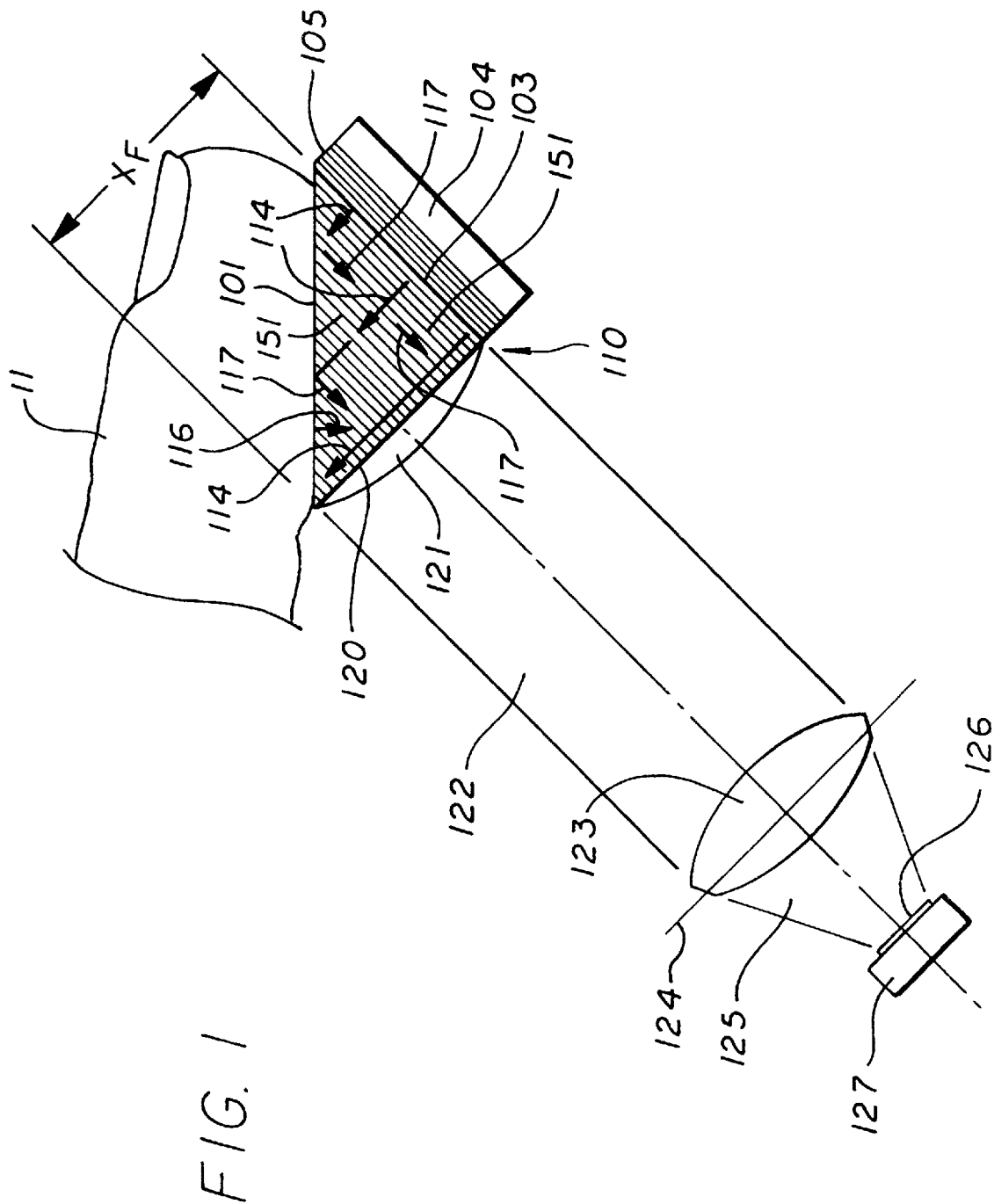

1. OPTICAL CONFIGURATIONS (a) Bright-field systems—As shown in FIG. 1, preferred forms of the invention include a fiber-optic prism 110 for contact with a relieved surface such as a finger 11, to provide an image of its relieved surface (also designated 11) to electrooptical means 126, 127.

The prism 110 includes a first end 101 for contacting the thumb 11, and second end 120 for transferring the image to the electrooptical means. The prism 110 also includes a side face 103 for receiving light, preferably infrared light, to illuminate the thumb 11; the width dimension of this side face 103 runs in and out of the FIG. 1 plane.

Figure 2:
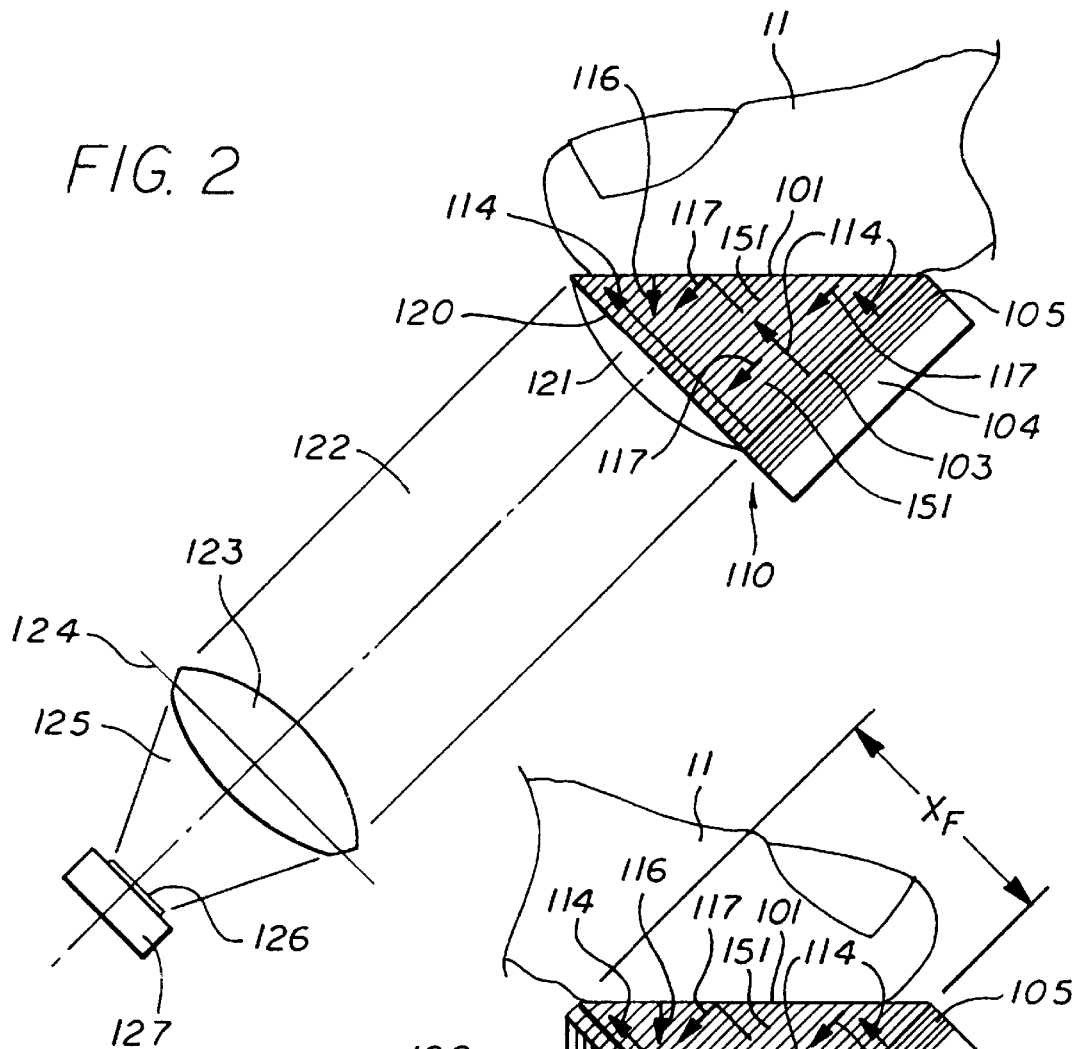

For optimum operation, as suggested by FIG. 2, the width of that side face 103 is the same as the width of the first end 101. This condition departs from the geometry in Dowling. If preferred, in this and the other embodiments described below, the side face 103 can be made wider than the first end 101, but the extra width serves little purpose.

In preferred embodiments as will be seen the illumination-receiving face is a cylindrical wall of the prism—but its operative dimension is substantially independent of longitudinal position. Associated with the prism 110 are a light source 104, and a fiber-optic spacer element or other diffuser 105 to somewhat equalize the illumination at the near and far sides of the prism 110. In preferred embodiments, for reasons that will shortly appear, the spacer 105 is replaced by a condenser lens formed as sections of two cylindrical surfaces.

Light rays 114 from the source 104 pass through the optional spacer 105 and cross varying fractions of the prism thickness, as shown, to reach the second end 120 of the prism. In so doing, the light must cross optical fibers 151, preferably fused, which make up the prism 110 and define the prism axis. The light 114 passes into the prism 110 at a steep angle—as understood from FIG. 1 a right angle—to the axis.

Accordingly the light 114 is not ducted along the fibers 151 in reaching the second end 102 of the prism. In particular this light must cross through the side wall of each fiber to reach the termination of that fiber which contacts the second end 102.

Hatching used in the drawings to represent the fibers is only illustrative, since the fibers are essentially microscopic. They are preferably spaced at a small fraction of a millimeter, though not as finely as mentioned in Bowker; the present coarser fibers have been found entirely adequate, and less costly.

The light illuminates the fingertip—and by FTIR relations, as set forth in Bowker, generates an optical image that is ducted along the fibers 151 to the exit 120 of the prism.

From the output face 120, field lens 121 and objective 123 carry the image from the end face 120 to the detector 126, which is in a housing 127. The field lens 121 does not reduce the image, but produces a beam 122 in which precompensation is present for the focal-surface-curving influence to be introduced by the objective 123.

In other words, the focal surface as represented in the beam 125 from the objective is substantially flat, to match the flat detector surface 126.

As a matter of ergonomics the FIG. 1 system may not offer the most comfortable or convenient configuration, in that no ideal position is left for the rest of the user's hand—that is, the knuckles of the other fingers, etc. Various ways of dealing with such geometrical considerations are shown in FIGS. 9 through 11, but here it may be noted that the thumb may simply be presented from the opposite direction (FIG. 2).

Another minor drawback is that the length of the thumb, applied along the hypotenuse 101 of the prism, appears fore-shortened by the factor $\sqrt{2}$ at the output face 120. This anamorphism is very easily compensated in firmware, but at the modest time penalty of an additional processing step.

Anamorphism can be eliminated by fabricating the prism in the form of a parallelogram as shown in Bowker, but with some space penalty. Another approach is to insert a short EMA section 431 (FIG. 3), having the same numerical aperture as the prism, followed by another 45° prism 432 which has a very high numerical aperture NA.

The fibers in the secondary prism 432 are angled at 45° (other angles can be substituted) to the fibers 157 in the main prism, yielding an overall secondary-prism 432 that is narrower by the factor $\sqrt{2}$. This solution corrects anamorphism while reducing the image in one direction, so that a smaller factor remains for the focal elements 421, 423.

This configuration has a drawback: coupling between the EMA section 431 and secondary prism 432 may be poor because the interface angles are extreme. Light loss may be severe.

To avoid severe fogging of the image in such a device, it is important to use a secondary prism 432, 632 that is properly designed to adequately preserve ducting of the signal rays, particularly through the transition 120 etc. from the primary to the secondary prism.

This constraint calls for a fiber structure 432, 632 of relatively high numerical aperture—but such a structure, without precautions, will also accept stray light across the same interface. The EMA-material buffer 431, 631 is important to avoid carrying stray light from the low-NA primary-prism fibers 151 into the secondary prism 432, 632.

It might be supposed that a series of successively smaller prisms in series could step down the image to the sensor 426 without any focal relaying; however, because each such fore-shortening is itself anamorphic it would be necessary to step down separately in each direction (i. e., in the plane of the drawing and perpendicular to that plane). Such a geometry would be rather cumbersome, requiring two cascading prisms for each overall stepdown factor of √2, or four such prisms for a factor of two.

Figure 3:
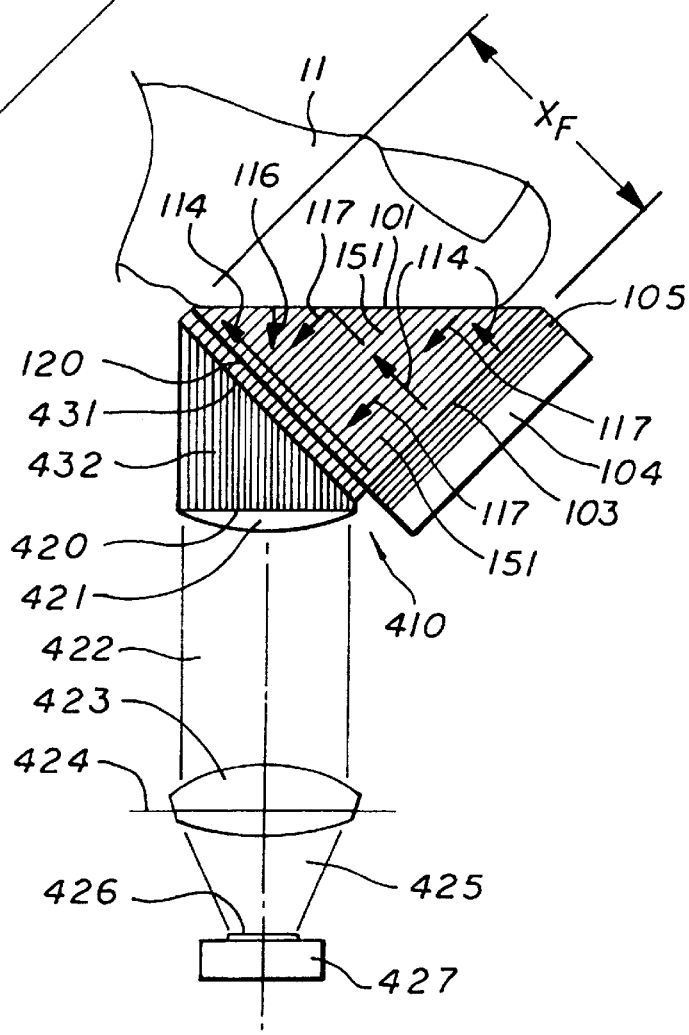

Another usefulness, however, of configurations such as that of FIG. 3 is to reduce anamorphically to a CCD 426 that is custom fabricated to a complementarily anamorphic pixel structure. In any of these cases the "prism means" 410, 610 comprise the two prisms 151, 432/632 considered together.

A mechanism for cross-fiber transmission and cylindrical diffusion is not generally recognized, but has been set forth at length in Bowker. As there explained, illumination undergoes a diffusion-like spread primarily in one plane and angular preservation in the other.

To approximate crosslighting penetration, it is possible to use a one-dimensional model that ignores the cylindrical cross-section of the fiber. This approximation yields transmitted flux $I=I_0 \exp[-x\alpha]$, where $\alpha=2r/D$—in which x is distance of propagation across the prism, r is the loss at each transition from fiber to fiber, the well known expression for reflection due to difference of refractive indices at normal incidence, $r=(n_{core}-n_{cladding})^2/(n_{core}+n_{cladding})^2$, and D is the periodicity of the optical-fiber structure in the prism.

The above expression for the flux I is not at all exact. It does serve to describe the basis of the diffusion over a distance which is short in terms of the diffuse-transmission characteristics of the material—in particular, perhaps over a small range of about two attenuation lengths.

A very generally exponential fall-off with propagation depth is expected, leading to an expression for required numerical aperture NA to make any given penetration distance x be exactly one attenuation length, $$x\alpha=1$$

$$NA=2n_{avg}(D/2x)^{1/4}.$$

To obtain this degree of penetration or better, at a distance $x_F$ along the illumination path needed to reach the far side of the prism, the condition on numerical aperture becomes instead $$NA \leq 2n_{avg}(D/2x_F)^{1/4}.$$

Materials offering a moderately continuous selection of numerical apertures, particularly in a low range, are not available now; the most popular materials have numerical apertures NA=0.66, 0.85, 1.0 and higher. One material commonly on the market does have a low-NA value of 0.35, and this is amply low for the condition described algebraically above.

(Numerical aperture of 0.35 is far too low for good ducting. This fact leads to a need for caution in configurations that require ducting.)

Optical-fiber prism materials with numerical aperture up to about 0.5, were they available commercially now, would correspond to an operationally marginal selection of material; and materials with numerical aperture of 0.36 to 0.42— or more generally speaking about 0.4—might be seen as providing an ideal tradeoff between ducting ability and amenability to crosslighting. Tighter ranges may be stated for prisms of specific width, as shown in Bowker.

Intensity can be made to vary across the prism face smoothly (as well as minimally), with suitable choice of numerical aperture. Intensity varies abruptly (and greatly) with a poor choice.

Other aspects of fiber-prism crosslighting that merit attention are the illuminating devices and their use. High-brightness light-emitting diodes (LEDs) appear to be best, as outlined in Bowker.

Use of a bright-field system has some intuitive appeal, in collecting and analyzing the relatively intense light that internally reflects toward the detector at untouched portions of the prism face, producing a bright line on the detector corresponding to the locations of grooves in the thumbprint. Such a system produces a fixed upper white level.

Unfortunately in practice the dark level, corresponding to ridges, varies greatly along the ridge lines—from essentially black in some spots to a modulation as high as seventy-five percent (of the white level). The contrast $$(I_{max}-I_{min})/(I_{max}+I_{min})$$

commonly ranges from about one-seventh to nearly unity. The undesirably-higher "dark" level in most regions of the ridge lines severely detracts from the overall appeal of bright-field systems.

(b) Dark-field rectangular-prism systems—A suitable prism 210 (FIG. 4) is rectangular and considerably more massive than those of FIGS. 1 through 3 (although the length need not be quite as great as shown). Of course the relatively greater mass in itself is a drawback for the most miniaturization-sensitive applications of the invention—particularly personal weapons, portable telephones and the like.

In addition the illustrated auxiliary coupling prisms 205 add considerable undesired size and weight to the assembly. The function of these prisms is to avoid three problems: high reflection losses, low Lambertian (cosine law) flux through each side face 203 of the main prism 210, and difficult source-to-prism alignment.

These adverse effects, however, can be mitigated without adding such large coupling prisms 205. Mitigation is attainable through substitution of a number of smaller prisms, side by side. While it is possible to use a large number of tiny molded facets similar to those of a Fresnel lens, an ideal number is probably small, as for example between two and five prisms.

Tending to offset the drawbacks of greater mass apparent in the main prism 210 of FIG. 45 are higher contrast and improved uniformity of illumination Because lighting can be applied from both sides, some evening-out of the illumination is possible.

With opposed lighting the illumination from each side provides half the intensity at the midplane or centerline 219. In view of the binary character of the FTIR detection process, total midplane intensity (for the $1/e^2$ case) is sufficiently close to initial intensity for marginal operation. Beyond that point the intensity continues to fall off exponentially, so that the intensity fraction which reaches the far side of the prism is the square of the fraction which reaches the midplane.

Light is supplied from twice as many directions—but only half as much light from each direction. Consequently a derivation of numerical-aperture constraints for crosslighting of the FIG. 4 system proceeds to the same algebraic results, except for substitution of the midplane notation $x_M$ for the far-side notation $x_F$.

Figure 4:
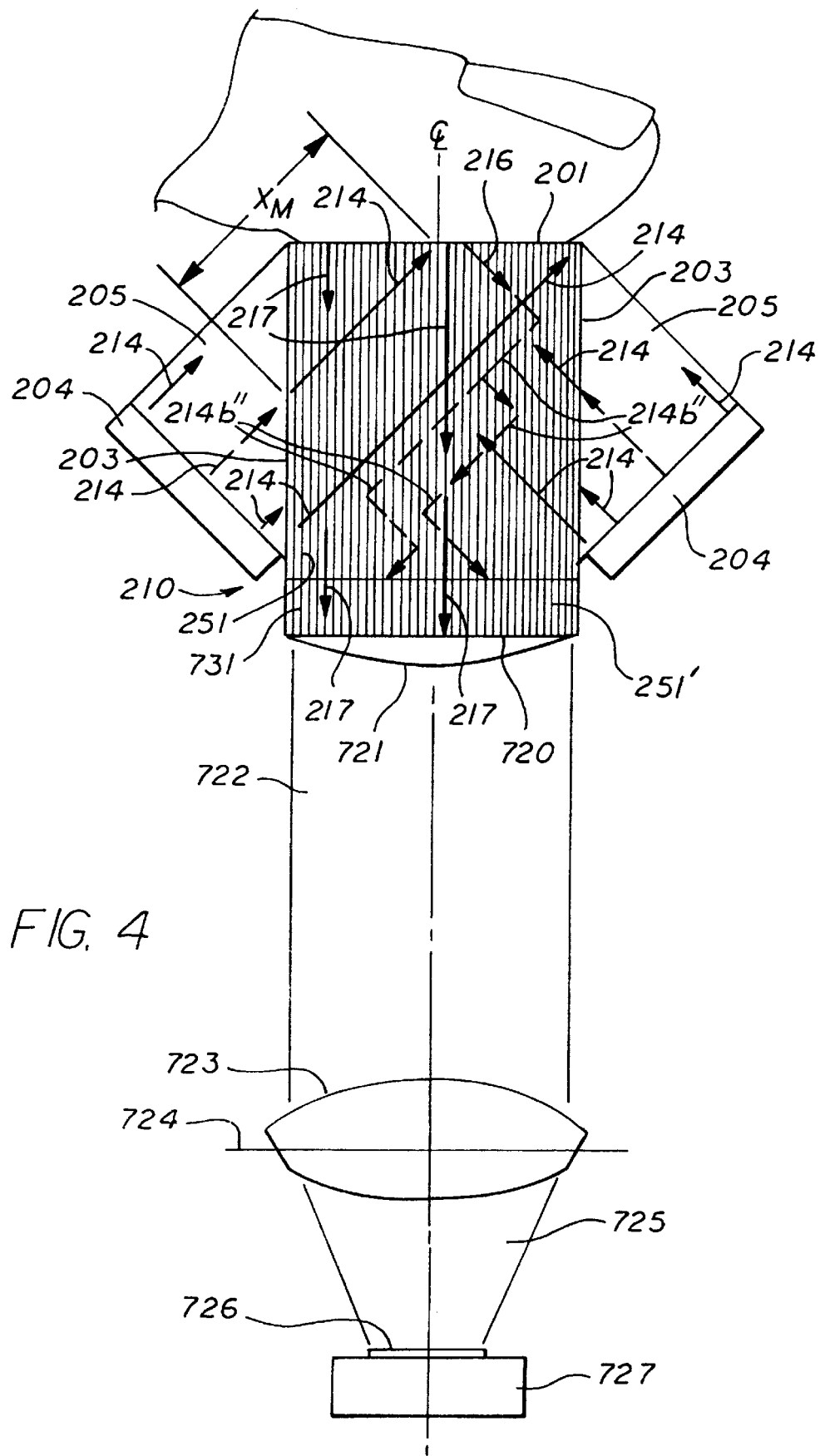

The main prism 210 is rectangular not only in the plane of FIG. 4 but also in the width dimension that runs in and out of the plane of the paper. Therefore, unlike the prior-art geometry, the light-entry side faces 203 are at least as wide (not shown) as the thumb-contacting first end 201.

Detector-size concerns mentioned above in connection with bright-field apparatus are even more troublesome here, due to the larger cross-section, by the factor √2, of the FIG. 4 rectangular dark-field prism (particularly at its second end 202). They may be addressed by use of focal elements such as lenses 721, 723 (or mirrors).

Unfortunately dimensions of the focal elements or step-down modules too—and their resulting overall optical-train length—are larger, by at least the factor $\sqrt{2}$, than the analogous bright-field elements 432, 421, 423 and overall optical-train length of the bright-field systems.

FIG. 4 also shows the particularly problematic stray-light rays 214b" derived from specular reflection 216 of the excitation illumination 214 and diffusely propagating toward the detector—transversely to the fibers, through myriad reflections at the fiber interfaces. These are captured and absorbed by a short section, just before the second end 202, of fibers 251' that have EMA material.

The short EMA section 251' can be either a separately manufactured prism block or unitary with the main fiber block 251, as preferred. It is desirable that the numerical aperture of the EMA section 251' be about the same as the main block 251: if the EMA section 251' has higher numerical aperture, it will accept and transmit much or all of the stray light—thus defeating the purpose of the absorbing section 251'. If the numerical aperture of the EMA section 251' is lower than that of the main block 251, then some signal rays 217 will be undesirably discarded.

As the drawings suggest, the EMA section 431 (FIG. 3), 731 (FIG. 4) need not be long—but again it must not have higher numerical aperture than the main block. Otherwise the following portions of the optical train would fail to serve the purpose of transmitting only the optical signal, and would instead transmit a large fraction of the specularly-derived stray light to the detector.

Figure 5:
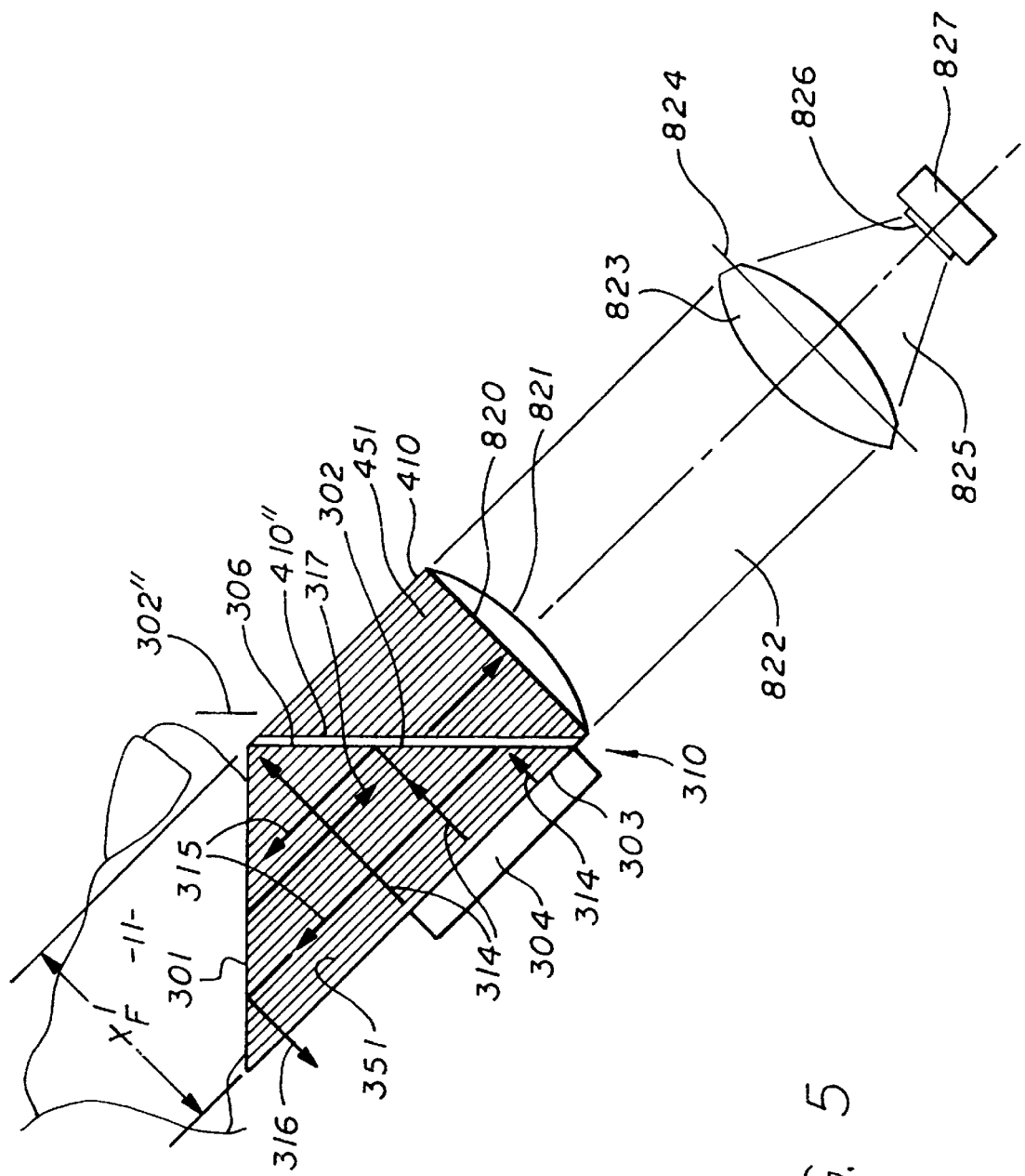

(c) Dark-field partial-reflector systems—In the embodiment of FIG. 5, light reaching the second end 302 of the prism 310 encounters a partial reflector 306 that is formed on that end 302. The reflector 306 is in essence a half-silvered mirror, but the exact fractions of light which are reflected and transmitted are subject to design choice and not necessarily half.

A portion of the incoming light 314 reaching the reflector 306 is redirected to form rays 315 ducted along the fibers 351 toward the thumb 11. The remainder of the incoming light 314 passes through the partial reflector 306, and are prevented by the system geometry from reaching the detector 826.

The reflected and ducted rays 15 flood essentially all the fibers 351 of the prism, and with relatively uniform intensity, to illuminate terminations of the fibers 351 at the first end 301 of the prism 310 and so illuminate the thumbprint or other relieved surface 11. By virtue of FTIR relationships, this illumination either is reflected (at thumbprint grooves) out of the prism as exit rays 316 or is transmitted through some of the fiber terminations into the relieved surface 11 (at thumbprint ridges).

The relieved surface 11, and the mass of living tissue (or other material) within or behind that surface, is slightly translucent and acts as a scattering medium—diffusing and redirecting the incident light 315 in all directions though not uniformly. A small fraction, perhaps on the order of one thirtieth, of the light fraction transmitted into this medium is partially scattered as rays 317 back into and along the same fibers 351 which brought the illumination 315.

The latter, backscattered light 317 thus exists only in certain fibers that are in effect selected by the geometry of the thumb or other relieved surface 11. These rays 317, and the pattern of their occurrence in some fibers 351 but not others, accordingly constitute the optical data or information signal which is collected from the thumb etc. 11.

Upon reaching (for the second time) the partial reflector 6, some of the light 317 passes through the reflector to reach the focal system 820–825 and thereby the detector 826, 827. Most of the remaining light (not shown) is wasted in reflection back toward the entry face 303.

2. DETECTION (a) Geometry and mechanical arrangements—As indicated in Bowker, the image produced by the crosslit fiber prism can be detected by using a lens to directly image the output face of the prism onto a self-scanned detector array. The present invention uses such a conventional imaging system.

Many different combinations of element sizes and geometries of course are possible. We have experimented extensively with rectangular blocks cut to 45° prisms as in FIGS. 1 through 5. In that format, a representative successful system has input and output prism sides 103, 120 each 16 mm long.

Such a system may be imaged onto a CCD of dimensions 4.8 mm by 6.4 mm (with an 8 mm diagonal) using a field lens 121, cemented directly to the prism and of focal length 40 mm—and an objective 123 of focal length 8 mm. The objective is a compound lens having typically three to six elements.

The object distance (overall length of the beam object segment 122), from prism face 120 to effective central plane 124 of the objective 123, is 34.6 mm. The image distance (overall length of the beam image segment 125), from the latter central plane to the sensitive surface 426 of the CCD, is 10.4 mm. Multiplication (actually reduction) is thus 3.33 and the objective representatively operates at f/1.6.

In such a system the field lens provides no magnification, but serves particularly to provide a flat focal plane at the CCD and also render illumination more uniform there.

We now prefer, however, an innovative cylindrical prism for bright-field systems such as FIGS. 1 through 3—as will be explained in greater detail shortly. For very economical commercial systems using such a prism, we currently prefer a detector of dimensions 2.4 by 3.4 mm, requiring stronger reduction.

(b) Detector types—Detectors that can be used are primarily CCDs (charge-coupled devices), CIDs (charge-injection devices), and SSDs (self-scanned diodes). All of these are made in two-dimensional arrays by many manufacturers: Texas instruments, Fairchild. Tektronics, Kodak, Dalsa, Phillips, Thomson, Sony, Hitachi and so on—and in a large variety of sizes, and costs.

Smaller and cheaper devices include the Texas Instruments TC211, with 192 by 165 pixels, measuring 13¾ by 16 microns as mentioned above (for overall dimensions 2.64 mm square); and the TC255 with 243 by 336 pixels measuring 10 by 10 microns (overall 2.4 by 3.4 mm, and as mentioned above our current preference). These are made for mass-produced consumer items and cost less than $25.

3. SIGNAL PROCESSING AND ELECTRONICS OVERVIEW

Discussion of the sensor array leads us to the electronic and firmware subsystems of our invention. We therefore digress from optical details to an overview of those subsystems.

A very great body of patent and other literature relates to the interpretation and particularly comparison of fingerprint data once acquired. These range from primitive visual analysis to ultramodern holographic correlators with neural-network sensing. Along the way are computerized systems that abstract, classify and compare skin-pattern details called minutiae.

Also known are computerized optical correlators of somewhat greater sophistication, among which may perhaps be categorized the analytical system described in Bowker. Many of these different kinds of data-analysis systems, from visual analysis and minutiae analysis to nonholographic optical correlators including that in Bowker, suffer from inadequate input-image quality—and accordingly would benefit from the teachings of the present invention.

Portions of the present invention are compatible with any of the analytical systems just mentioned; in other words, the benefits of the present invention will accrue in use with any of these analytical systems. The now-contemplated best mode of practicing the present invention, however, is in conjunction with a newly developed analytical system and method set forth in the concurrently filed patent document of Lawrence R. Thebaud, Ph. D., mentioned in the preceding "RELATED PATENT DOCUMENTS" section.

Thebaud's analytical inventions are of the computerized optical-correlation type, but are extraordinary in many ways: they systematically take into account global or isomorphic dilation or compression of a print due to varying pressure of fingertip application to the sensor, and differential distortion due to uneven pressure or twisting of the fingertip; in addition they actually use all of the available image data, rather than discarding almost all of it as in all known non-holographic systems. The present system in conjunction with Thebaud's is commercially available from Biometric Identification, Incorporated of Sherman Oaks, Calif.

The firmware resides in a circuit that is in essence a custom computer. It is set into operation by a microswitch 501 (FIG. 6), which in the preferred embodiment is actuated by fingertip pressure on the fiber-optic prism digital signal process 503. In other implementations, a striped vane or other very coarse pattern above the optical input (beyond the finger position) may be used to detect presence of a fingertip to be analyzed; however, this would require maintaining the sensor system in at least partly or periodically operating condition.

Operation of the switch 501 activates a clock generator 502, which clocks a digital signal processor 503. The processor 503 at this point is able to do little more than interrogate a data bus 504 for startup instructions from the "boot" section of a template-and-boot EPROM 507. The EPROM instructs the processor 503 to load its main program and initially needed data from a separate read-only memory 506 into random-access memory within the processor 503.

The processor complies, moving data and program into its internal RAM from the main ROM 506. The signal processor thereby becomes sapient to the extent needed for operation of the entire system through the bus 504.

At that point the system is ready to begin actually processing new data, and the processor 503 via the bus 504 commands a video controller 508 to acquire data. The video control 508 is a custom circuit, or to put it more precisely a custom-programmable logic circuit, which replaces a conventional sensor-reading module known familiarly in the art as a "frame grabber".

A conventional frame grabber would be an entire circuit board, e. g., a card in a personal computer. Hence a massive amount of volumetric compression has been obtained by development of the video control 508 alone, and this is accordingly another important part of the invention.

When thus actuated by the processor 503, the video control 508 takes charge of the front end of the system, commanding a timing generator 509 to start a clock driver—which in turn sequences operation of the sensor array 512. The latter is at present a CCD ("charge-coupled device") as shown, but as mentioned earlier may take any of a number of other forms for greater economy, convenience etc.

As is well known, a CCD is an integrating device. The integration time of the CCD is settable. In the present system integration time is controlled in hardware. For later development stages, however, the processor preferably can be made to monitor contrast in the data array and automatically adjust the integration time so as to optimize the implicit image contrast thereafter—for the particular fingertip, condition of the prism surface, condition of the illuminators, and condition of the CCD.

Analog data from the sensor 512 are buffered 513 and held essentially a frame or major frame subelement at a time in a sample-and-hold circuit 514, from which they are available for conversion to digital form for processing. For convenience of understandable operation, and for convenience of debugging, in the present system—which is at a relatively low-production-volume design stage—the sample-and-hold circuit 514 formats the CCD data as eight-bit bytes in a sixty-four-bit word.

This may be regarded as in essence "real video" in the sense of conforming very generally to conventional broadcast or computer-video-display specifications. For higher-volume design development, however, it is contemplated later to use a custom chip specially programmed for more efficient and faster operation.

While the video control 508 sets these data-acquisition modules into operation, it also synchronizes operation of an A/D converter 517 which reads buffered 515 analog data frame-wise or wordwise from the sample-and-hold circuit 514 and passes those data in digital form to the processor 503 via the data bus 504. Thus the start-up command launched on the bus 504, from the processor 503 to the video control 508, is answered by a very large flow of data back along the bus from the ADC 517 to the processor 503.

In some applications, additional information such as a personal identification number of other confirming information is required, either before or after the candidate user's fingerprint data are obtained. If so, the processor may ask—audibly, as through a voice chip 505 and speaker 505', or visually as by means of light-emitting diode indicators through output register 518, or an alphanumeric display 521, or by combinations of these—for entry of such information by the candidate user at a keypad 522.

For this purpose the processor 503 also activates a buffer register 523 to receive inputs from the keypad 522 and return them in an orderly fashion, also along the bus 504, to the processor. As is now commonplace for such processor/user dialogs, the processor advises the user—again by speaker 505', LEDs through output register 518, or display 521—if for any reason the processor is unable to proceed with the information as entered.

Otherwise the processor uses the information, as for example to select a particular authorized-user template from the EPROM 507, and goes on with the verification work—according to the program instructions and operational data previously read in from the memory 506—for the fingerprint data received. Upon completion the processor may instruct the sound chip 505, or LEDs, or display 521, or combinations of these indicators, to indicate the decision.

Concurrently the processor, also through the same register 518, may actuate an internal relay 519 to provide a switch closure to an external relay that provides access to utilization means. In more-sophisticated systems as mentioned elsewhere an interactive access actuation can be substituted; and if desired this may be effectuated through the serial communication controller 524 and a conventional RS232 serial-data port 525.

In some systems data may travel in or out of the system for other reasons. Templates may be fetched from a remote computer, or from an identification card carried by the user and inserted into a local card reader. Decisional signals may travel to a remote computer for logging or monitoring. For any of these purposes, once again the serial controller 524 and port 525 may provide needed links to the cooperating apparatus.

4. DOORWAY ACCESS

A fingerprint analyzer according to our invention is readily associated with locking mechanisms of a door 960 (FIG. 7) and built into an associated door handle 961, 962. Power connections (not illustrated) may link the apparatus with an outside supply or with a supply that is internal—e. g., batteries in the lock.

The power is needed for illuminators 904 as well as for actuating the sensor 927 and verification processing system 997. In addition, in the case of FIG. 7 the fixed door handle 961–962 is only used to pull or push the door and has no part in mechanically operating the bolt 963 or its drive mechanism 999.

That mechanism 999, too, accordingly must be powered—most ordinarily by electricity from the supply as for example in the case of a solenoid drive 999. Since the supply must provide enough power to actuate the bolt 963, most ordinarily this particular embodiment will operate from external power rather than from internal batteries.

Light from the illuminators 904 enters the fiber prism 910, which is also contacted by a thumb 11. A different finger can be used, but this particular type of handle is most easily operated by one hand with the thumb 11 at the outer top corner of the handle and other fingers curled about the inclined lower portion 961.

Operation of the print analyzer and the door itself in this way is particularly natural, easy and instinctive. A switch or other means (not illustrated) are provided for initiating operation of the lights 904, sensor 927 and interpretation module 997.

An image of the thumb 11 is collected by the crosslit fiber prism 910, and projected by a field lens 921 toward the objective 923—which focuses the image on the much smaller active surface of the sensor 927. The sensor 927 responds by passing a data array to the processing system 997, generally in the fashion described earlier in the preceding electronics-overview section of this document; and if the verification is positive the decisional system 997 operates the mechanism 999 to withdraw the bolt 963 from the door jamb.

Equally ergonomic in use is a system with rotatable door handle 961', 962' (FIG. 8)—the shaft portion 962' of the handle being journaled 964 for rotation relative to the door. Here it is the mechanical rotation of the handle that provides the actual motive force for withdrawal of the bolt 963.

For example as suggested in the drawing the bolt 963 may be toothed along its bottom edge to form a rack. The rack engages a pinion 967 that rotates with the door handle shaft 962'.

In this system the decisional module 997' may perhaps operate a smaller bolt or pin 965 that is withdrawn only from an associated block within the door. When shot, the pin 965 simply prevents operation of the door handle shaft 962'.

This mechanism requires much less electrical power and so may possibly be suited for operation from a battery.

One variant of the FIG. 8 rotatable configuration uses a doorknob 962" (FIG. 9) rather than a door handle. The prism here is off-center and its output image coupled by a optical-path folding mirror 932.

If it is preferred to dispose the finger-contacting surface vertically, rather than at a 45° angle, the prism 1010" (FIG. 10) in another variant of the FIG. 7 or 8 system may be coupled to the relay optics 1021–1024 by a bent fiber-optic element ("light pipe") 1058.

As to the optics, in still another variant of the FIG. 7 or 8 system, a more ideal solution is to mount the sensor 1127 (FIG. 11) directly on the output face of the fiber-optic prism 1110, optionally with wiring 1111' to carry the signal to the processor.

5. SYSTEMS

Our invention viewed generally may include—i. e., encompass, not only a print-verification system or print analyzer 96, but also an access-control module 97 which acts as an intermediary with utilization means 99. In other words, for purposes of certain of the appended claims the invention does not end at the case of the analyzer 96 but extends rightward in the drawing to include the access-control unit 97.

Similarly for some purposes, and within the sweep of certain of the appended claims, the invention includes the utilization means 99. This simply means that the utilization means, the access-control unit 97, and the analyzer 96, all considered together, are part of a new and improved combination.

The analyzer 96 includes a sensitive surface 91 for contact by a finger, thumb, toe, or other skin-pattern member 11. The sensitive surface 91 is part of a sensor module 92, with lights and detector powered from a supply 95 that either is entirely internal (as with batteries) or draws power from an external source for conditioning within the analyzer 96.

Signals 11' from the sensor module 92, representative of the skin-pattern 11 image, are compared with information 21 &c. from a read-only memory 93 (also powered from the supply 95) by a CPU 94. The CPU responds, particularly in case of a favorable decision, with a decisional signal 55e to the accesscontrol intermediary 97.

This signal 55e is preferably not merely a unidirectional on-or-off signal but rather part of an interchange of signals which validates the integrity of the connection as well as the entity whose skin-pattern 11. The access-control module may typically be a switch box or heavier relay that provides a lower-impedance signal, or a specialized drive waveform, or other motive means 98 to the utilization means 99.

The analyzer 96, through the access-control means 97, either enables operation of utilization means 99 if appropriate authorization is embodied in the received image, or maintain the utilization means 99 disabled otherwise. The utilization-means block 99 represents any of a wide variety of applications of a decisional signal 55e or access-control signal 98 such as the present invention generates.

One focus of the present document is upon use of the invention in, or as, a personal weapon; however, the invention is equally applicable to other apparatus, facilities, financial services and information services. The invention is particularly suited to field applications that are extremely demanding in terms of overall microminiaturization and low weight, very short decision time with very high certainty and reliability, and low power. Personal weaponry is an application which is particularly sensitive to several of these criteria, but close behind are other portable personal devices such as cellular phones and so-called "notebook" computers.

Use of the invention to control access to public phones, automatic teller machines, and vehicle-usage access—even though much less critical in terms of weight and power—all benefit significantly from the amenability of the present invention to miniaturization without compromise of decision time, certainty, or reliability. In some uses, such as telephonic and in-person credit systems, the apparatus of the present invention does not necessarily actuate a device to automatically grant e. g. credit, but can instead provide a visible, audible etc. signal to a human operator who then actuates any necessary devices.

Any or all of these means for utilizing the access-control signal 98 of the present invention are represented by the utilization means 99.

6. PREFERRED PRISM CONFIGURATION, FABRICATION AND LIGHT COUPLING

A cylindrical prism 530 (FIG. 13) provides several surprising advantages. The prism presents an elliptical face 534, the area of the hypotenuse, which fits the shape of a fingertip. Therefore the prism has no excess material—and fiberoptics prism material is costly.

Furthermore it is fabricated directly from drawn rods 536 (FIG. 14) of fused fiber-optic material. To minimize material loss in fact a large multiplicity of prisms 530a–530d can be cut in a continuing sequence simply by alternating transverse cuts 531 (FIG. 14) with 45°-angled cuts 534.

As illustrated, the resulting successive pieces 530a–d are alternating in their orientation (i. e., successive units of each pair are mutually inverted). Each transverse cut forms a transverse face of two adjacent but opposed prisms, and analogously each angled cut forms an angled face of two adjacent but opposed prisms.

In the preferred embodiment, prism dimensions are 15.5 mm diameter by 16 mm length. One side is cut at 45°. The proprietary "MEGAdraw" process of Incom, Inc. (Southbridge, Mass.) is used. Numerical aperture is 0.35, fiber size less than twenty-five microns, with no EMA material.

The cylindrical prism is, however, subject to one awkwardness in illumination. Whereas generally central rays 555 (FIG. 15) pass through the prism along fairly straight paths—as in the rectangular-prism case modeled earlier—rays 551, 552 near the edges or limbs of the structure are strongly refracted at the angled surface of the glass in those regions.

These peripheral rays 551, 552 are therefore redirected inward along sharply inward-turned paths, leaving badly light-starved or shadowed regions 553. The illustration suggests that these regions may be behind the midline of the prism; however, in practice the exact disposition of these regions depends upon the illumination geometry and refractive indices involved.

To provide more-uniform illumination, we have invented a special cylindrical condenser lens to restraighten the peripheral rays.

A ray-trace diagram for a high-performance condenser 545–547 (FIG. 16) formed from hard glass shows that uniform illumination can be provided in a very short distance. Illumination from the light-emitting diode 541 at far left passes through an integral diode lens 542, and then a concavo-plane lens 543–544.

The beam is tightly collimated in the dimension normal to the plane of the drawing, but in the drawing plane the beam from the concavo-plane lens 543–544 diverges severely to the first cylindrical-section surface 546 of the condenser 545–547. That surface refracts the rays inward, making them almost horizontal within the condenser.

The refractive index of the condenser rather closely matches that of the cladding and/or the average of cladding and cores in the cylindrical fused-fiber-optic prism—which is represented by the half-circle at far right. Moreover the second cylindrical-section surface 547 of the condenser closely matches the external cylindrical surface of the prism.

Due to these matches, the extreme rays 551, 552 undergo only a very little bending at the condenser-prism interface 547. The criterion for judging goodness of illumination here is the horizontalness of the rays in the fiber-optic piece, particularly at top and bottom as already noted. By this measure, the FIG. 16 system performs very well, as can be seen.

Angular spacing of the rays in this outer part is half as great as that of the rays in the center. A tilt in the rays indicates that strong shadowing can be expected near the edge of the prism at its widest part.

Figure 17:
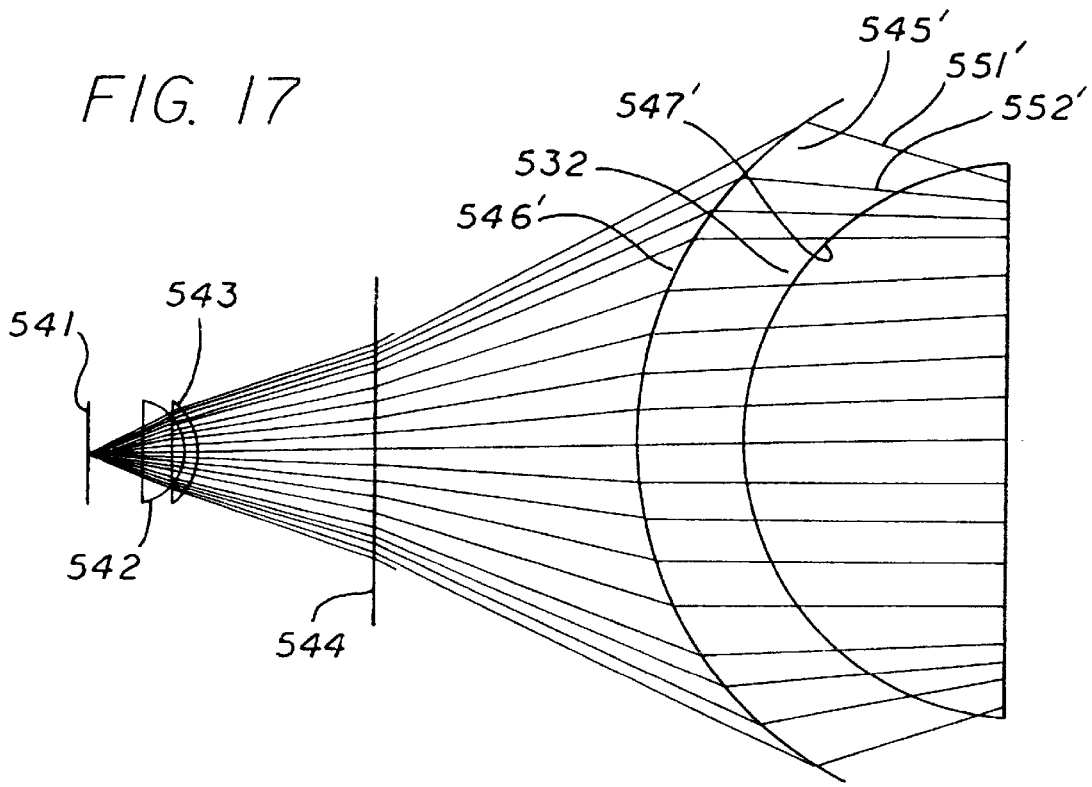

A ray-trace diagram for a much less costly alternative condenser 545'–547' (FIG. 17) shows a compromise performance. Actually the axial spacings here are dictated by the optical bench design that set the spacings in FIG. 17; therefore some improvement can be obtained by optimizing for this device rather than accepting the design for that of FIG. 17.

Figure 18:
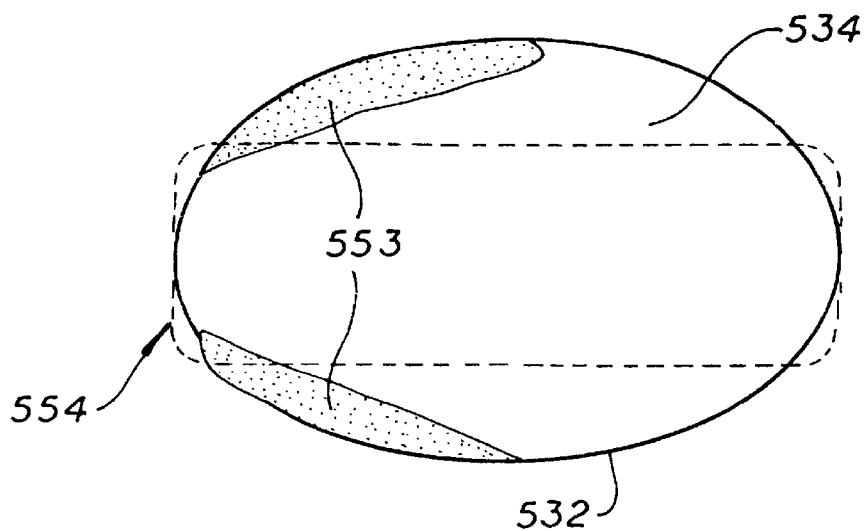

At any rate, the peripheral rays 551', 552' in this case are plainly not controlled as well as the corresponding rays 551, 552 in FIG. 116. Therefore a certain amount of shadowing 553 (FIG. 18) may be expected, as suggested by the conceptual view of FIG. 15.

In this drawing, illumination is from below, and at an upward angle from right to left. The thin end of the prism is at right. Thus the shadowed regions 553 in this instance are in fact behind the midline as predicted from FIG. 13.

Figure 16:
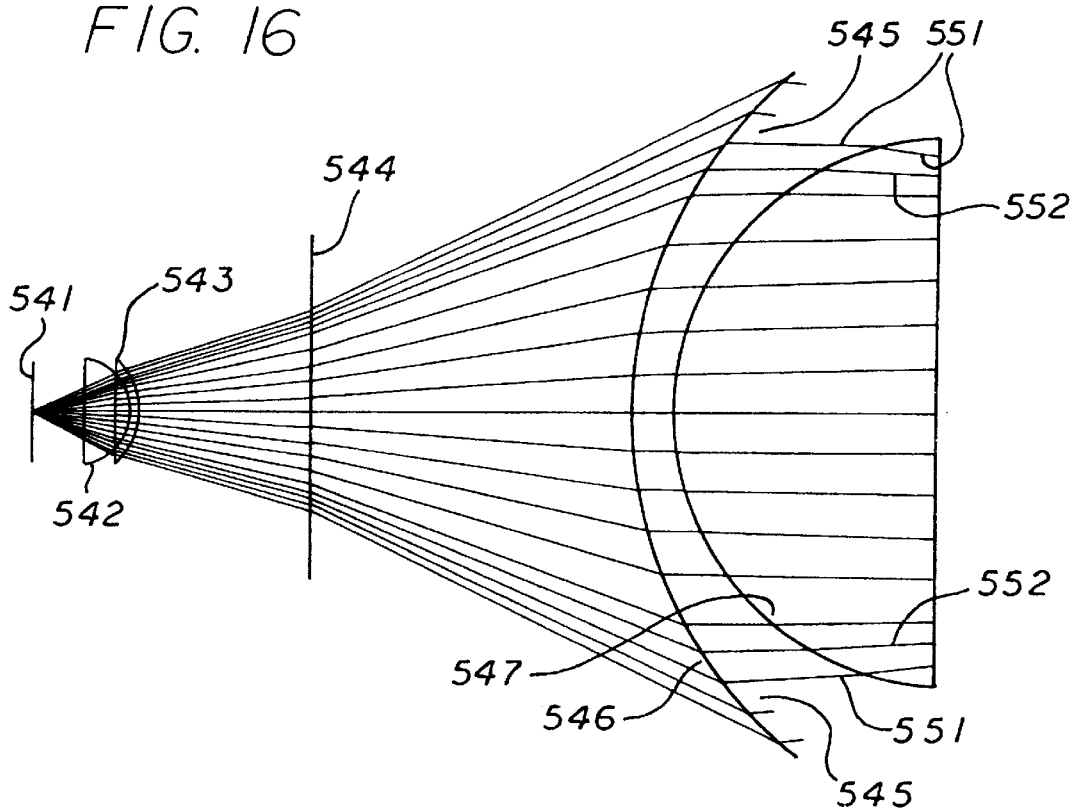

With care this shadowing can be minimized and made essentially insignificant, although performance of the FIG. 16 unit is inherently better. This alternative condenser is made of standard acrylic tubing—costing some forty-three cents per foot—with as-fabricated polished surfaces and is simply cut out of the stock material; it can be made by any machine shop.

In particular, however, care must be taken to avoid separation of the acrylic piece from the fiber-optic piece due to temperature expansion effects that might cause the rupture of a cement (e. g., epoxy) bond. If there is a partial rupture at the ends, where the angles exceed the critical angle the light will reflect at the interface—and in this case the outer third of the prism will not be illuminated, except by diffusion. The preferred embodiment uses relatively coarse fibers, which do not diffuse as much as the finer fibers contemplated previously.

Stresses are smaller for a thinner cross-section at the narrow vertex between the two cylindrical radii. In the present configuration that neck is only 1¼ mm (0.05 inch) thick and so readily bends and stretches to accommodate differential thermal effects—as has been verified by freezer and oven cycling.

The condenser in the preferred embodiment of our invention serves as the mounting piece for the fiber optics and the illumination device as well. Thus it introduces several cost savings.

Figure 19:
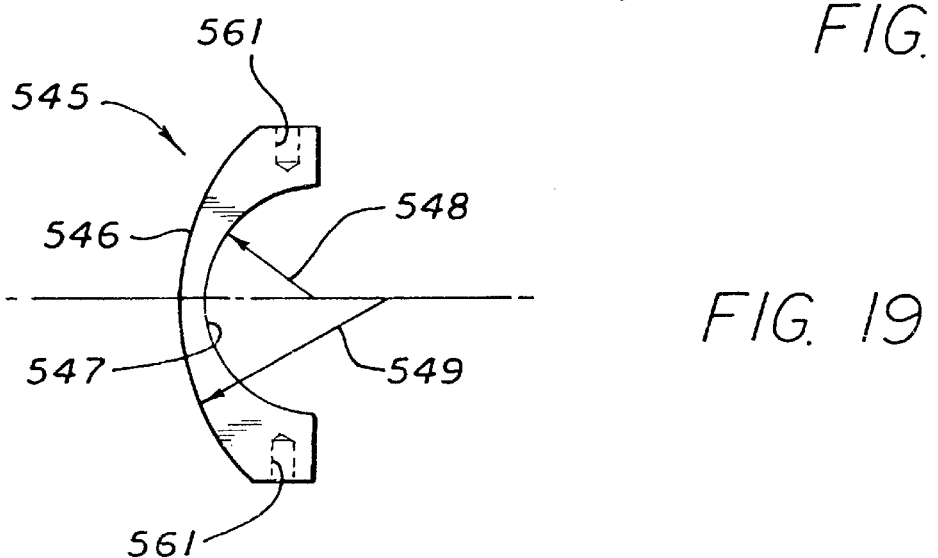
Figures 20, 21:
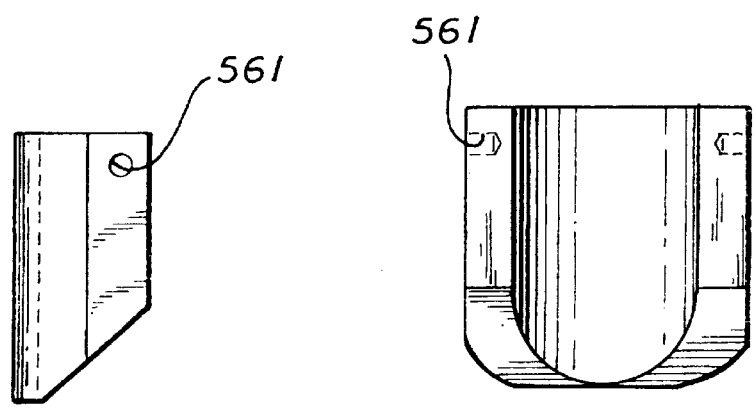

It is cemented to the prism, preferably with Norland Optical Adhesive type NOA 68. The condenser 545 is formed as a mounting cradle (FIGS. 19 through 21) for the prism, with mounting holes 561 and a tapered end as illustrated.

7. LAYOUT

Figure 22:
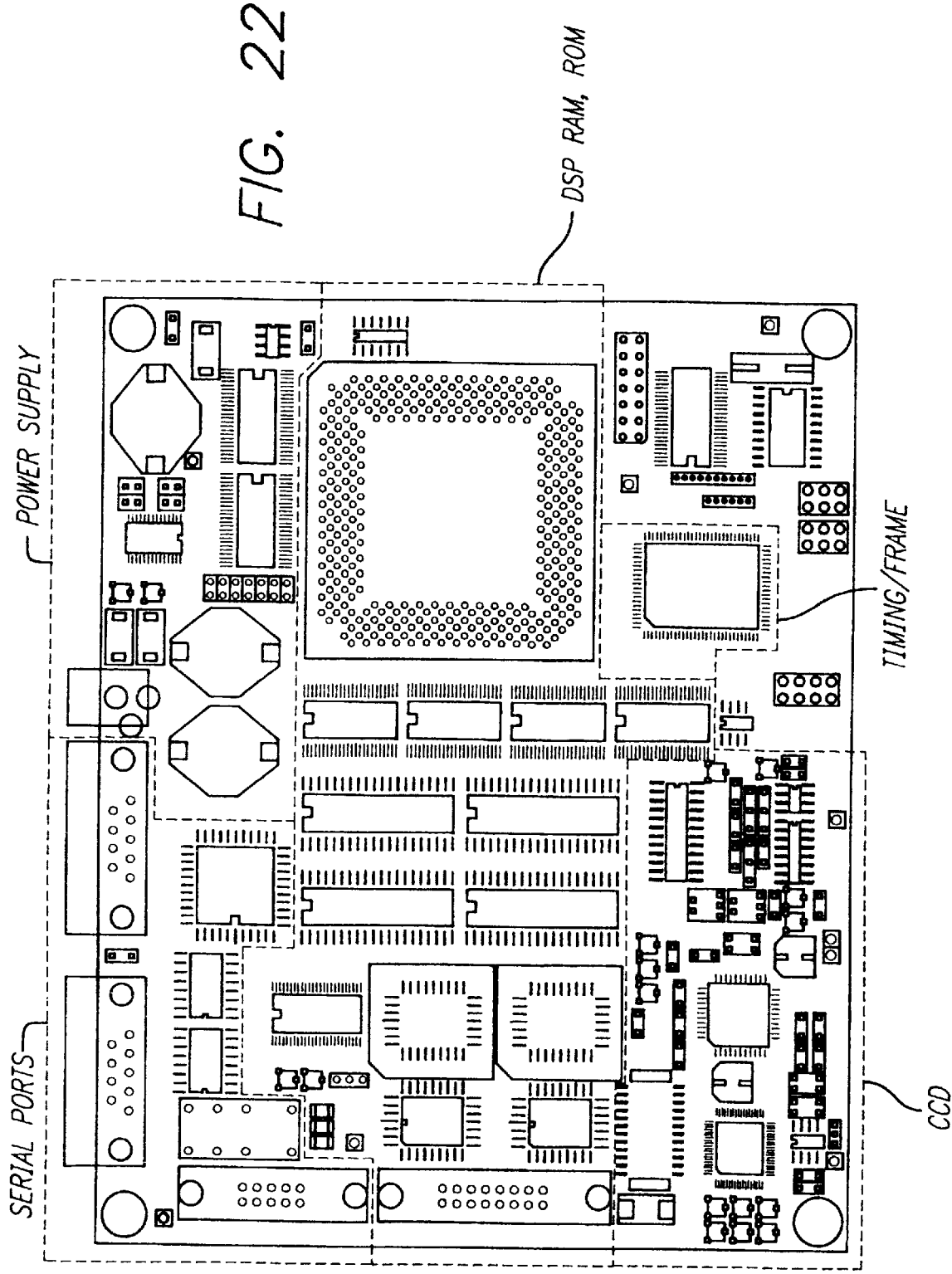
FIG. 22 is a detailed electronic circuit-board layout showing relative positions of main sections of the circuitry.
Figures 1, 23:
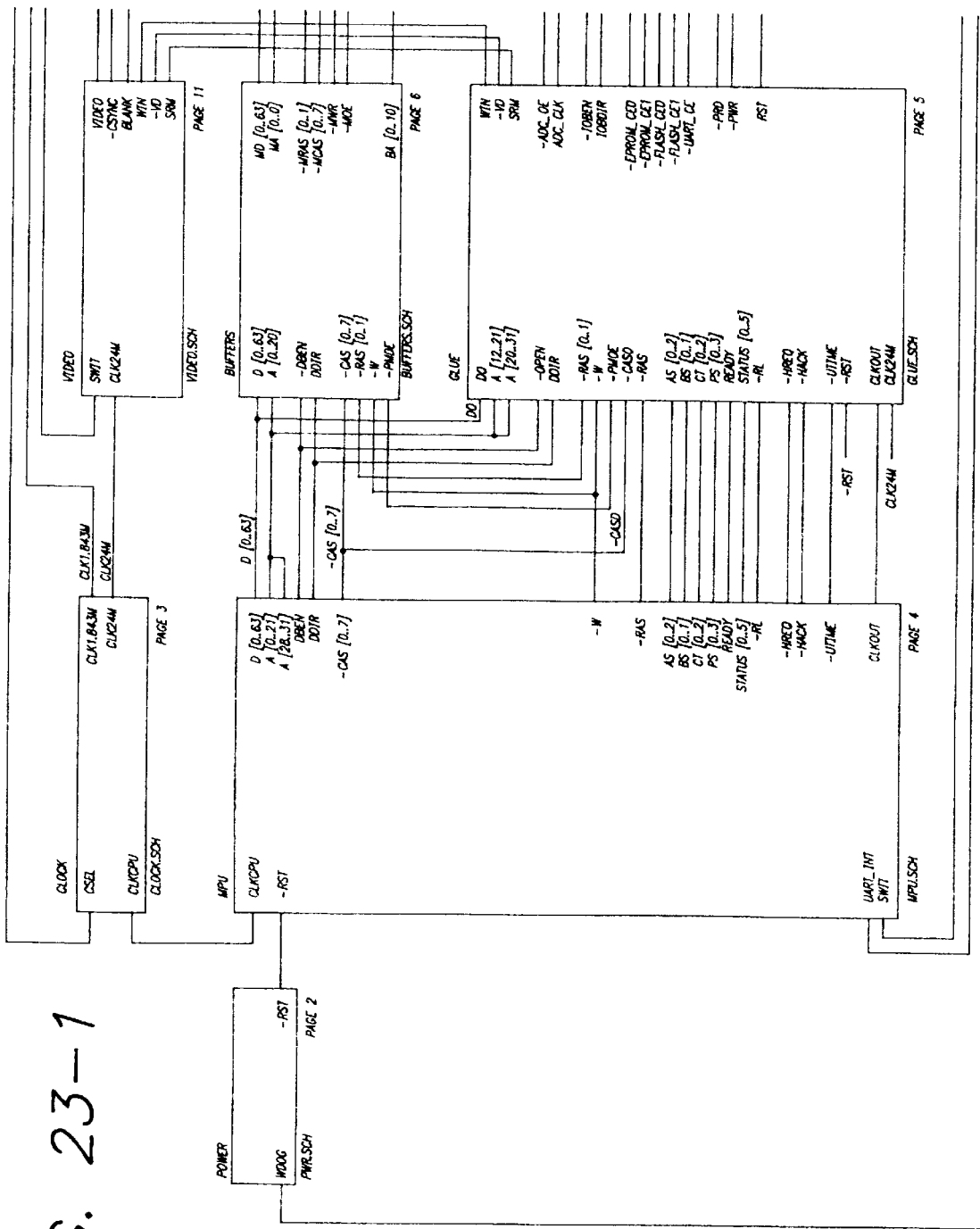
Figures 2, 23:
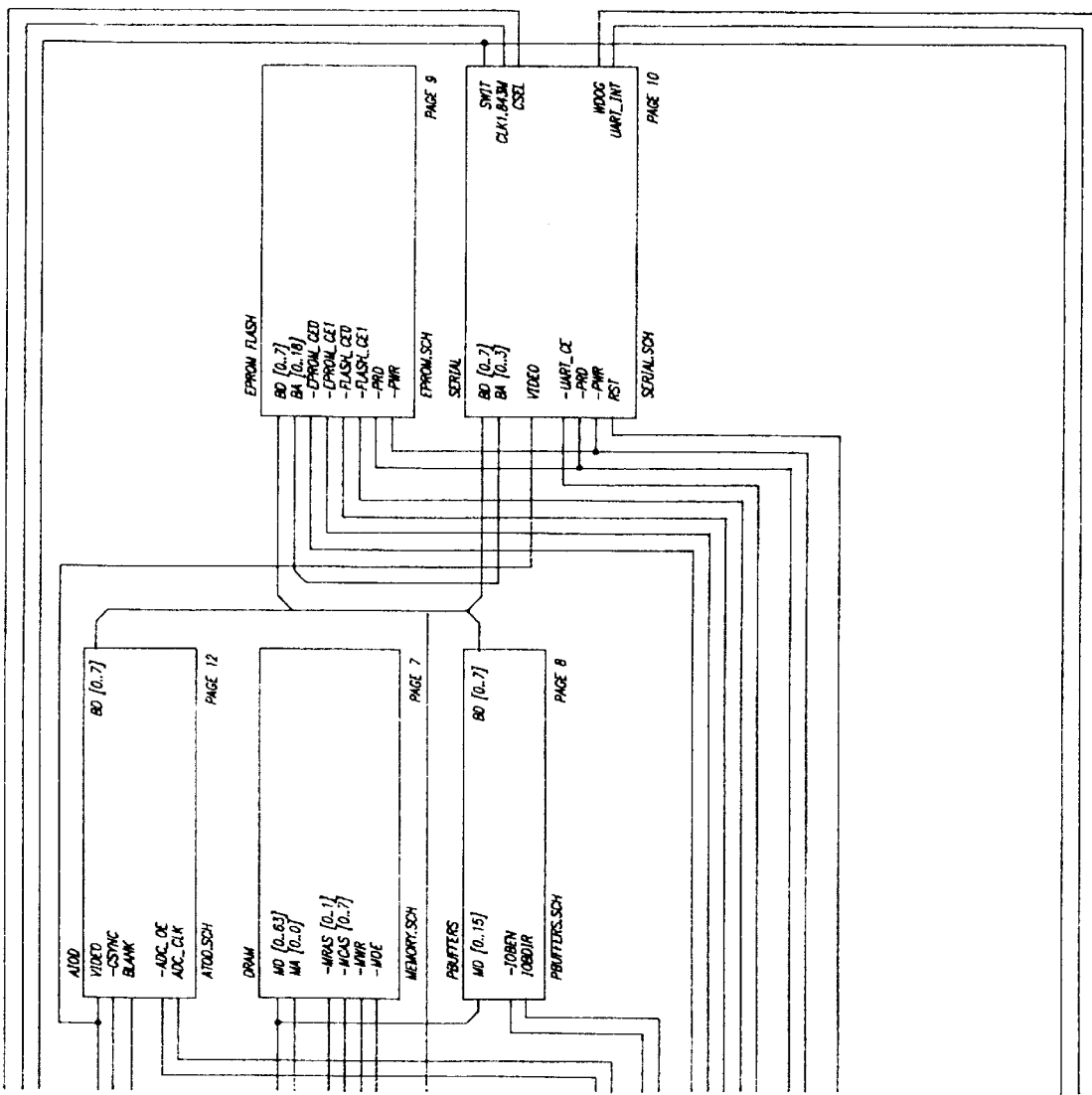
Figure 24:
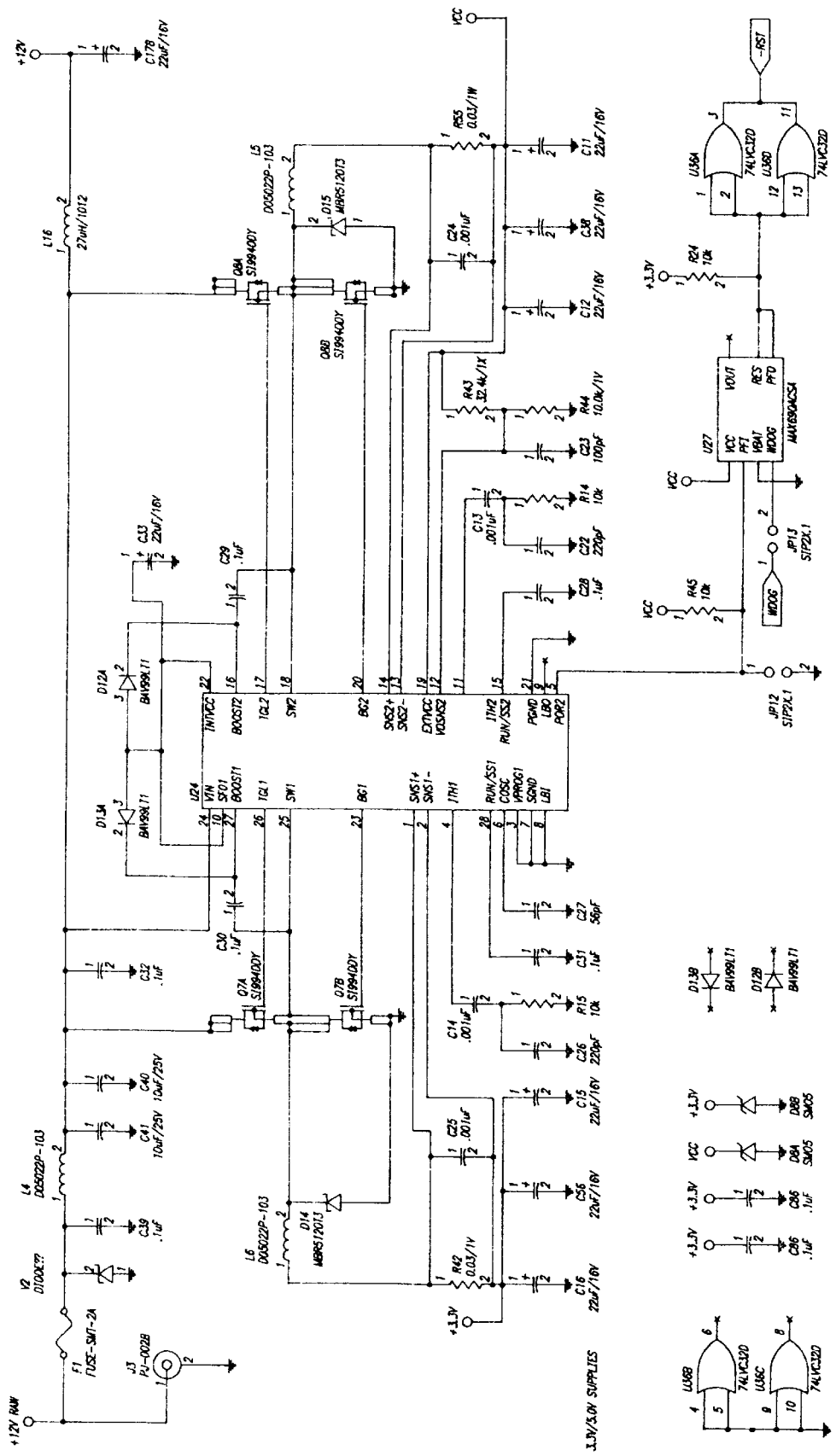
Figure 25:
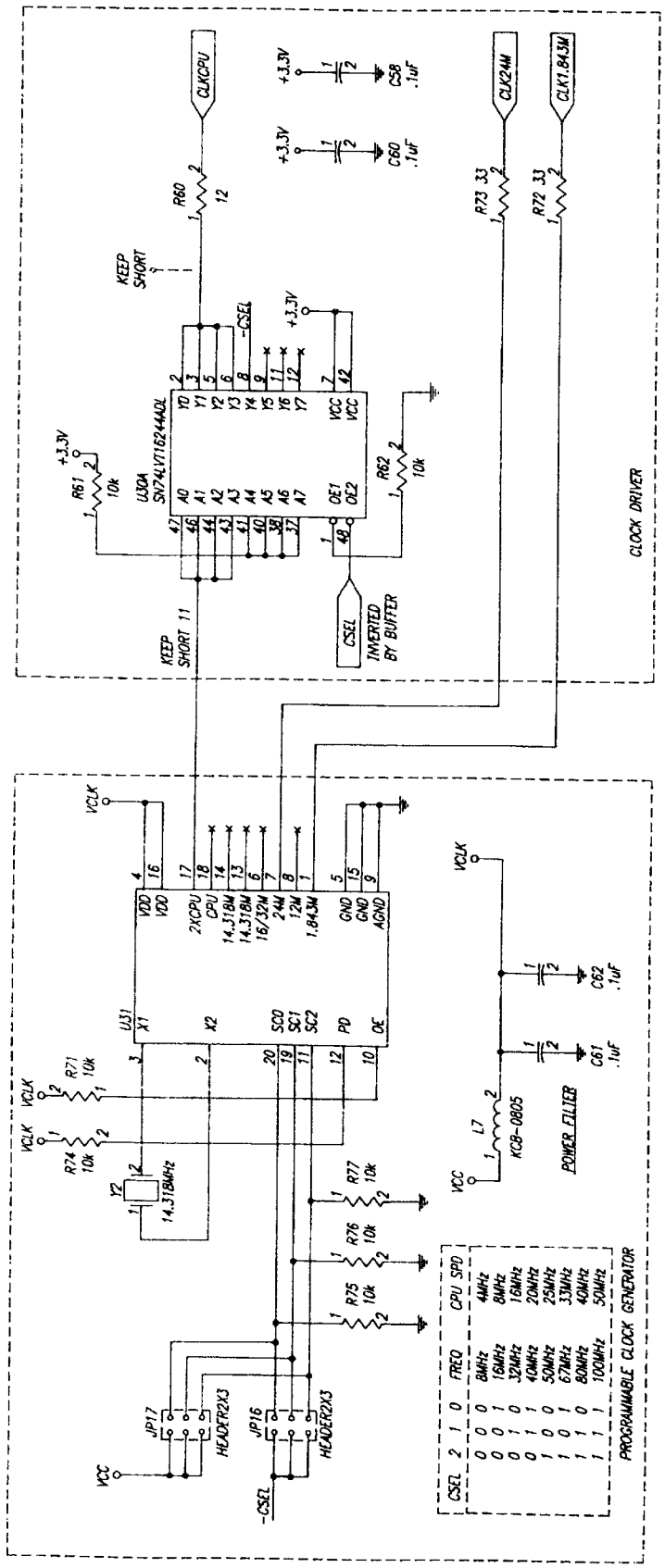
Figures 1, 26:
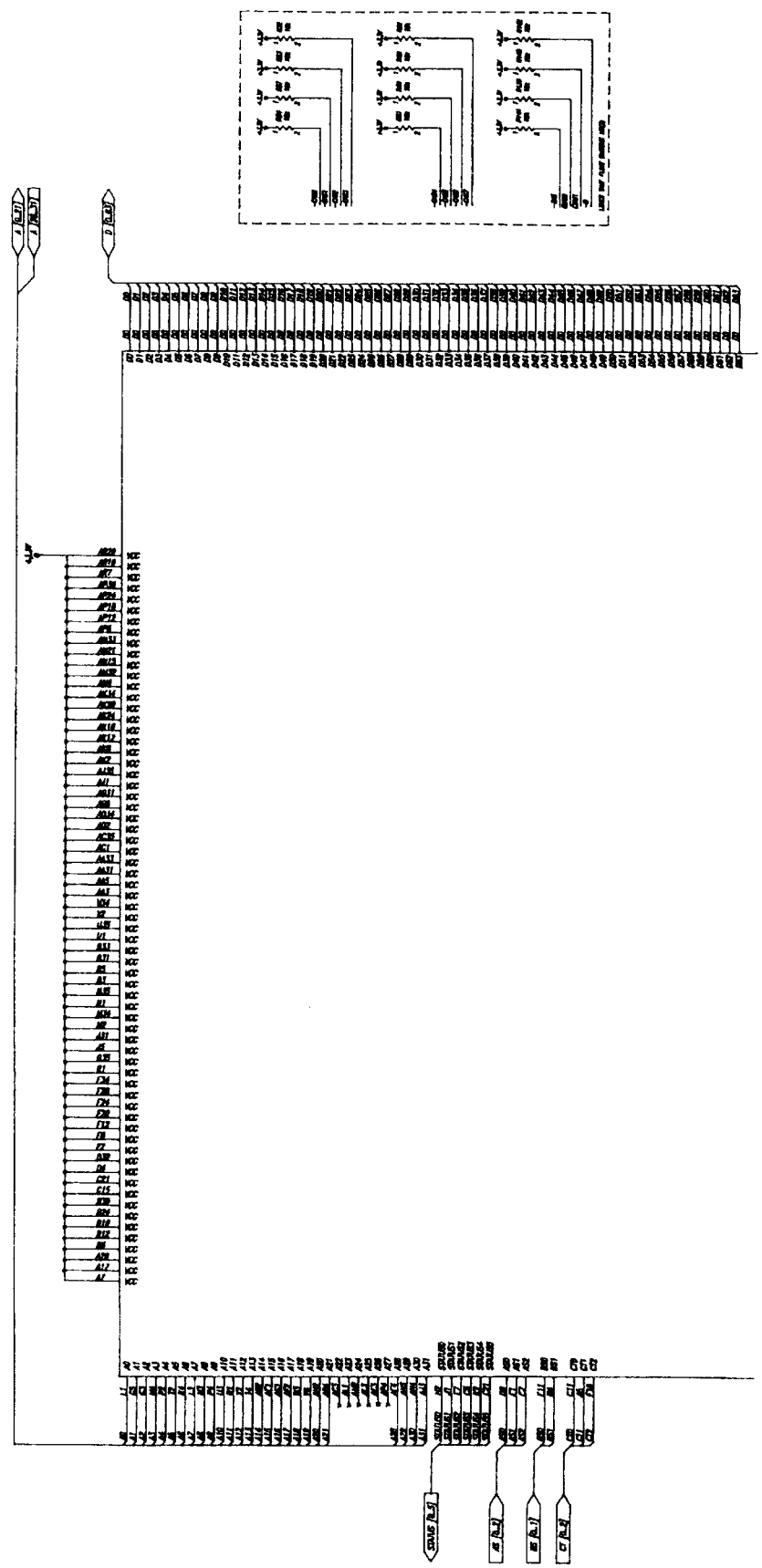
Figures 2, 26:
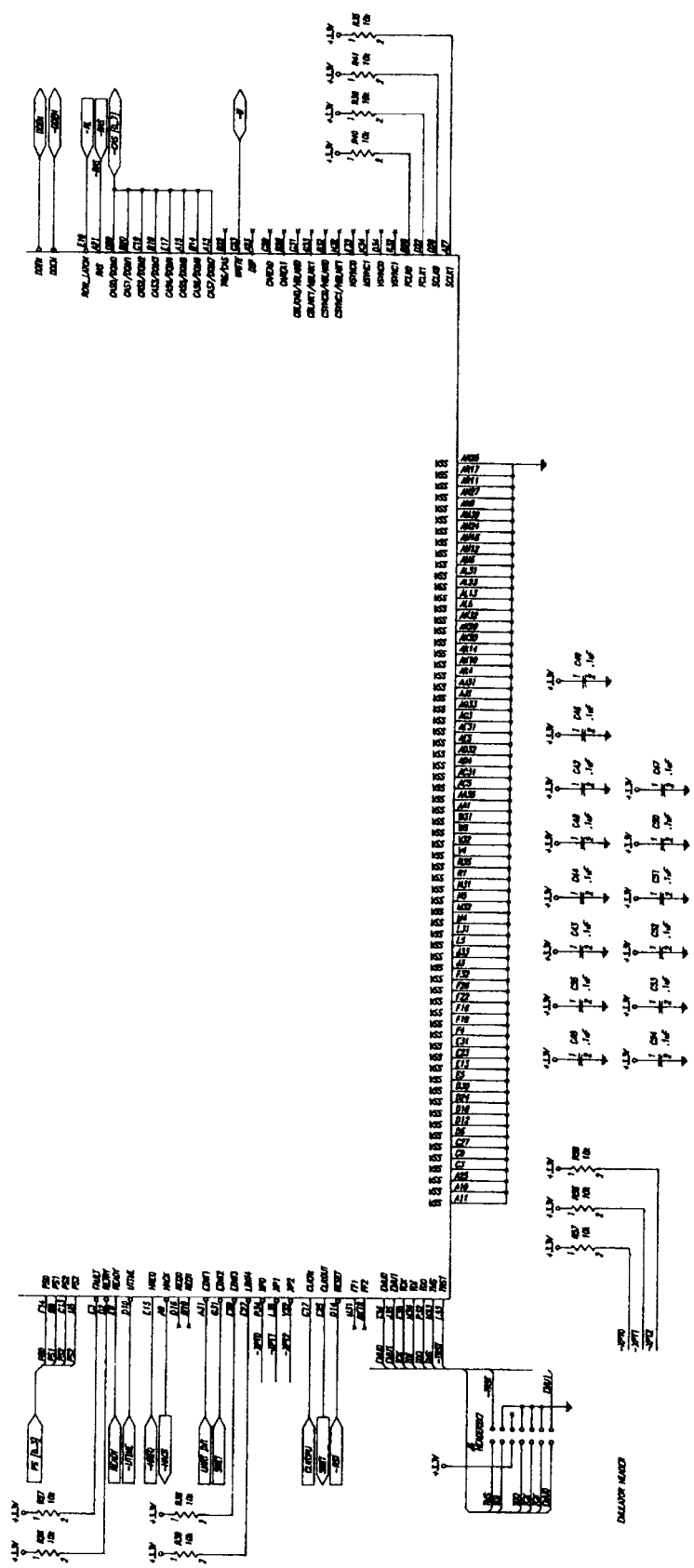
Figure 27:
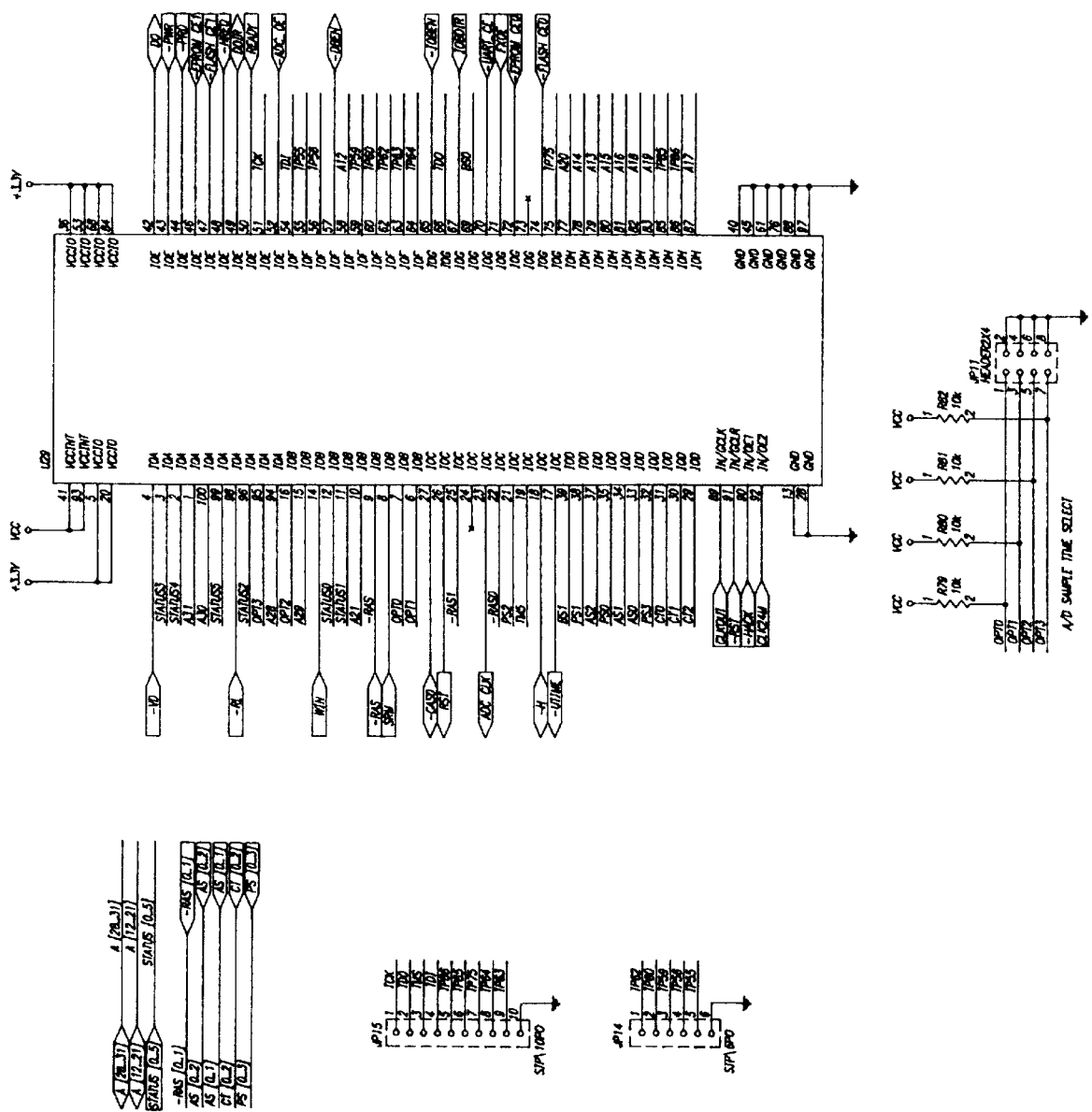
Figure 28:
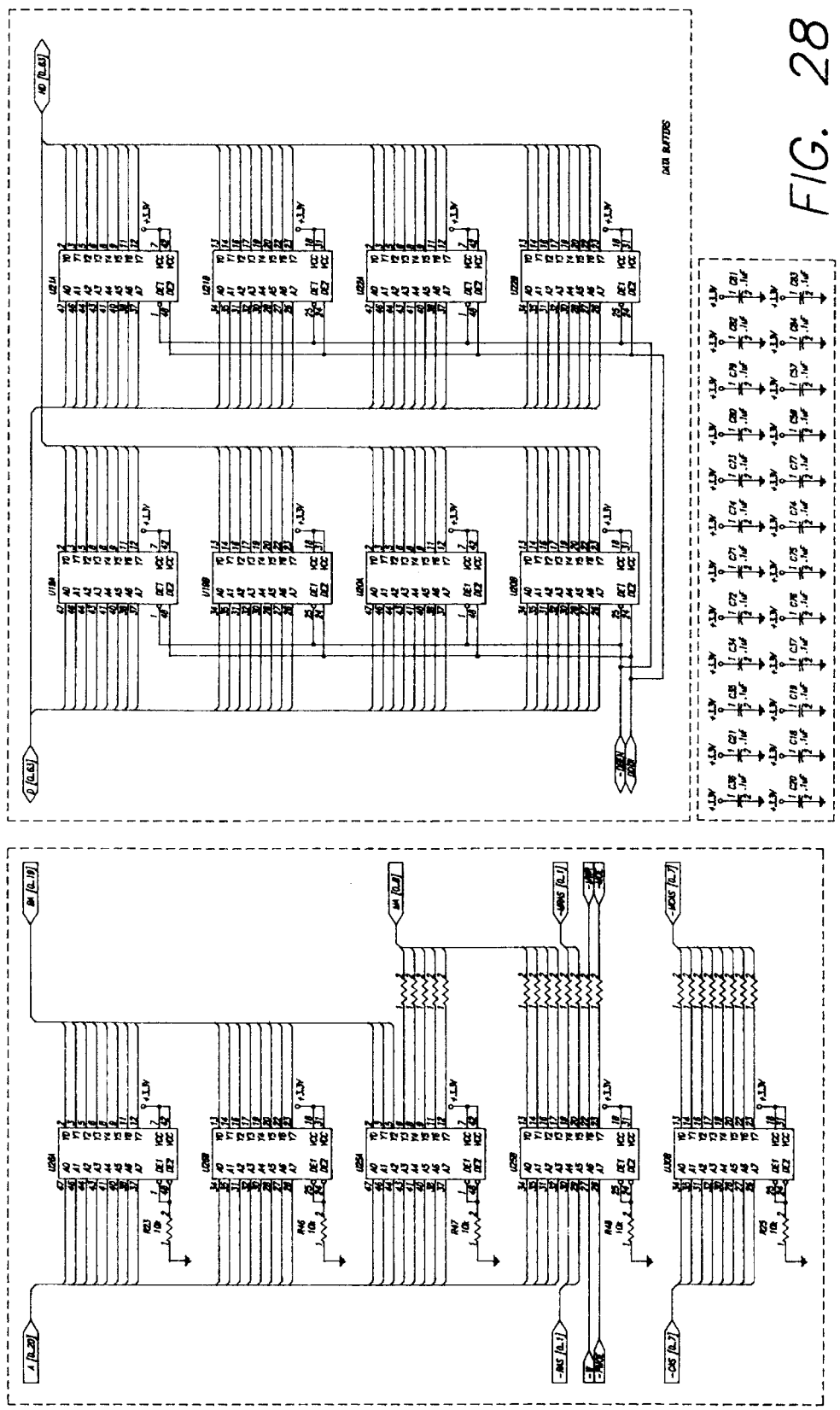
Figure 29:
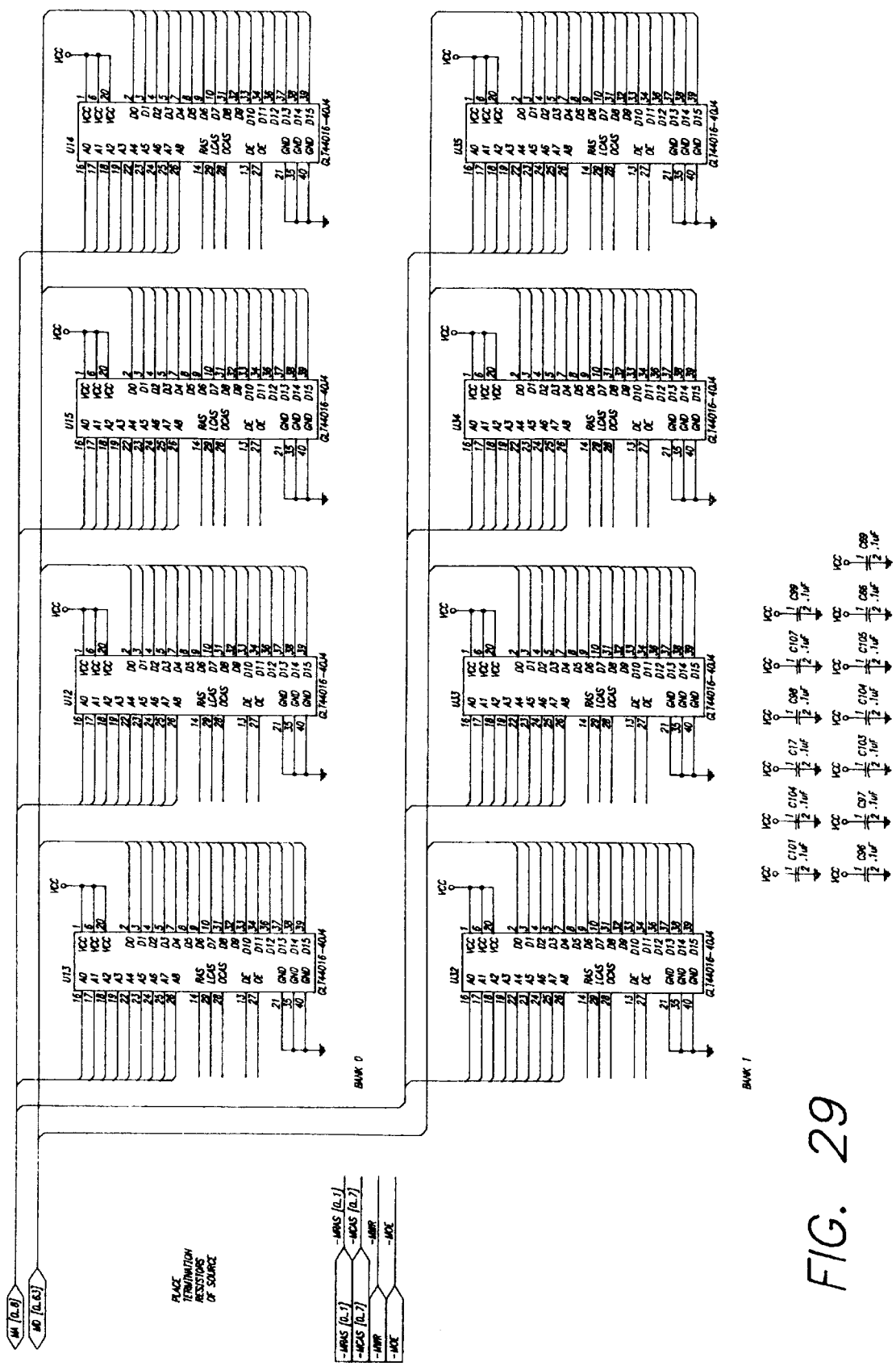
Figure 31:
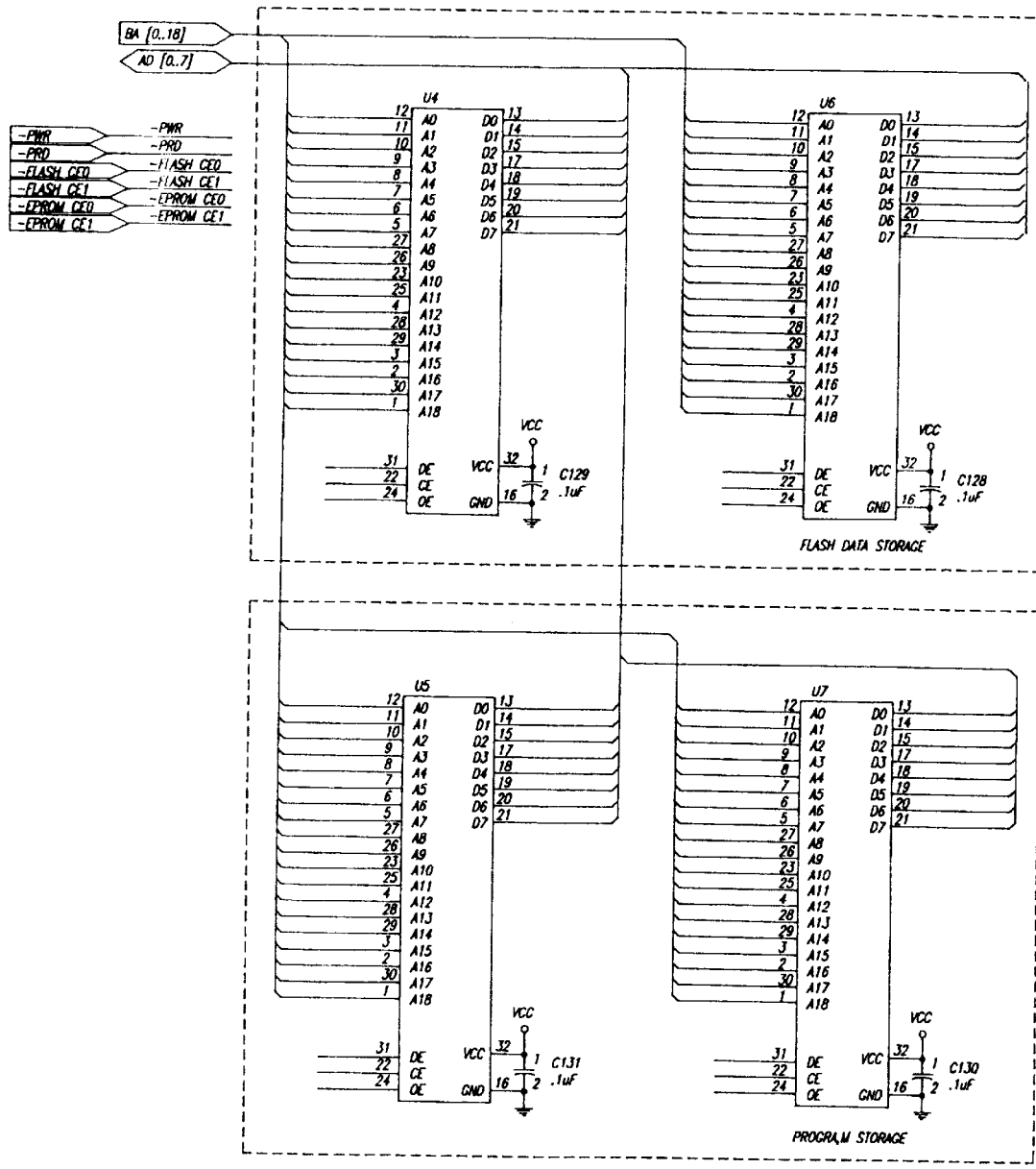

To adequately minimize the effects of electromagnetic interference, the layout of our circuit board (FIG. 22) is critical. Sensitive, extremely high-frequency front-end detector circuitry associated with the CCDs is at one corner of the board; high-radiation inductive switching power supplies are at an opposite corner.

Video control (timing/frame) are at a third corner, directly opposite the power supplies. The moderately high-radiation digital signal processor (DSP) is intermediate along the edge of the board between the video control and the power supplies.

Figure 32:
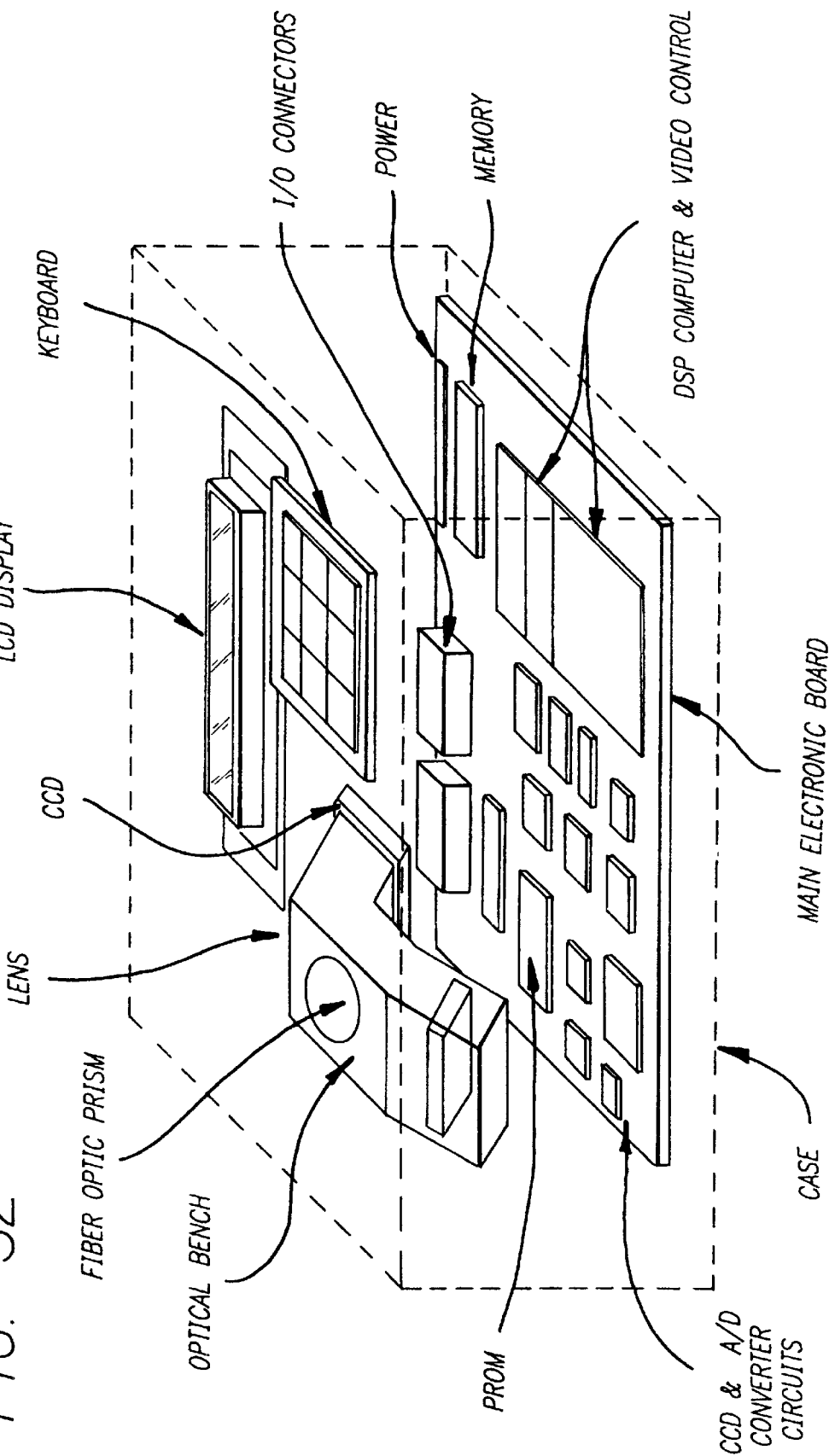
Figure 33:
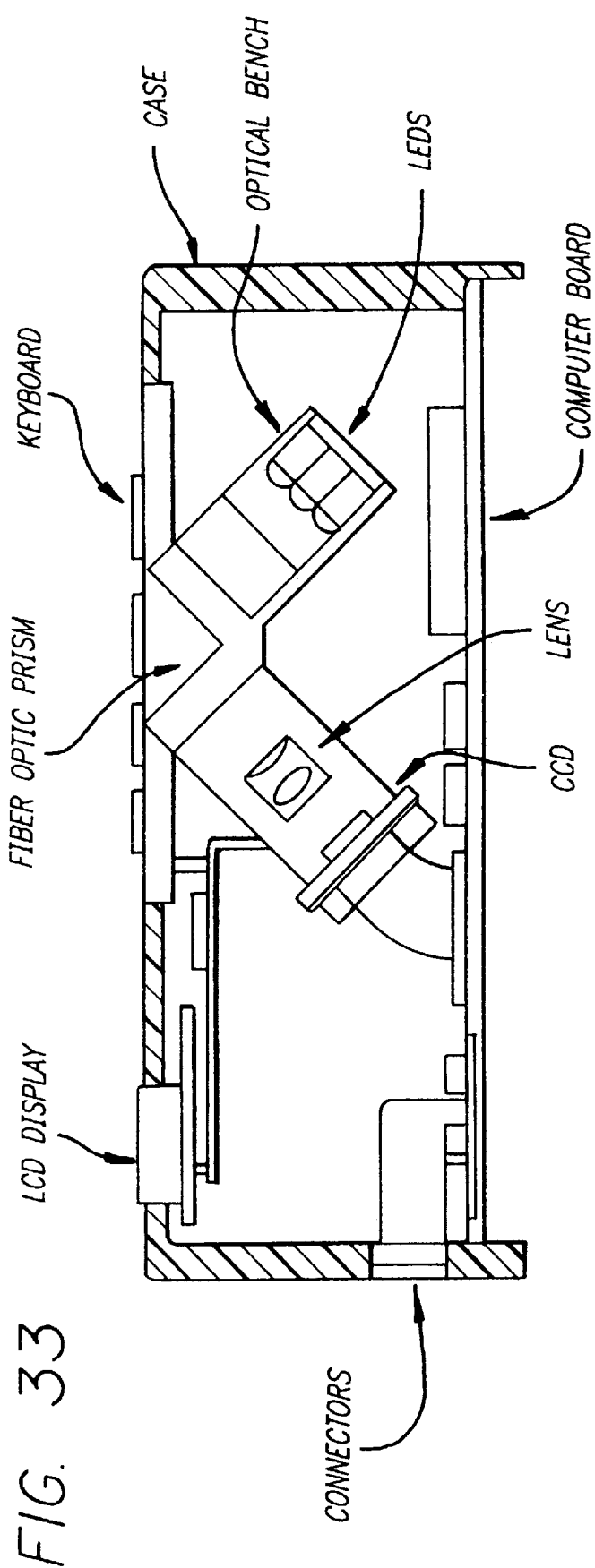

The mechanical layout (FIGS. 32 through 34) of the optics, CCD and I/O devices is also thoroughly integrated functionally with the electronic system. As shown, the unusual optical bench has two legs extending downward, at 45° to the horizontal, from the central body that holds the prism.

/CAS—translated 3.3 V to 5 V only; no gating needed. Need to tristate/CAS when/DACK is active to allow frame grabber to take over.
/OE—gated based on/DBEN, DDIR, DRAM address select.
/REG_OE—DRAM registered outputs. Gated same as/OE. Address Lines 12–21 go to DRAMS

| Select Line | Description | Starting Address | Bank size, bytes | AS[2:0] | BS[1:0] | PS[3:0] | CT[2:0] |
|---|---|---|---|---|---|---|---|
| | | | | Address Selects | | | |
| /EPROM0 | Eprom 0, 1 megabyte, 8 bits, 32PLCC, 80nS | 10 0000 | | 000 (static) | 00 (8 bits) | 1000 (8) | 110 nonpipe, 2 cyc/col |
| /EPROM1 | Eprom 0, 1 megabyte, 8 bits 32PLCC; 80nS | 10 0000 | | 010 (256k × n) | 00 (8 bits) | 1000 (8) | 110 nonpipe, 2 cyc/col |
| /DRAM | | 100 0000 (4meg) | | | 11 (64 bits) | 2010 (4k) | 100 pipe 1 cyc/col |
| /STAT_IN | Status In, 8 bits; take 256 locations | 100h | | 000 (static) | 01 (16 bits) | 2010 (4k) | 100 pipe 1 nonpipe, 3 cyc/col |
| /CNTL_OUT | Control Out, 8 bits; take 256 locations | 100h | | 000 (static) | 01 (16 bits) | 1000 (8) | 111 nonpipe, 3 cyc/col |
| /UART_EN0 | Uart, 8 bits; take 256 locations; 120nS | 100h | | 000 (static) | 00 (8 bits) | 1000 (8) | 111 nonpipe, 3 cyc/col |
| /UART_EN1 | Uart, 8 bits; take 256 locations; 120nS | 100h | | 000 (static) | 00 (8 bits) | 1000 (8) | 111 nonpipe, 3 cyc/col |

Figure 34:
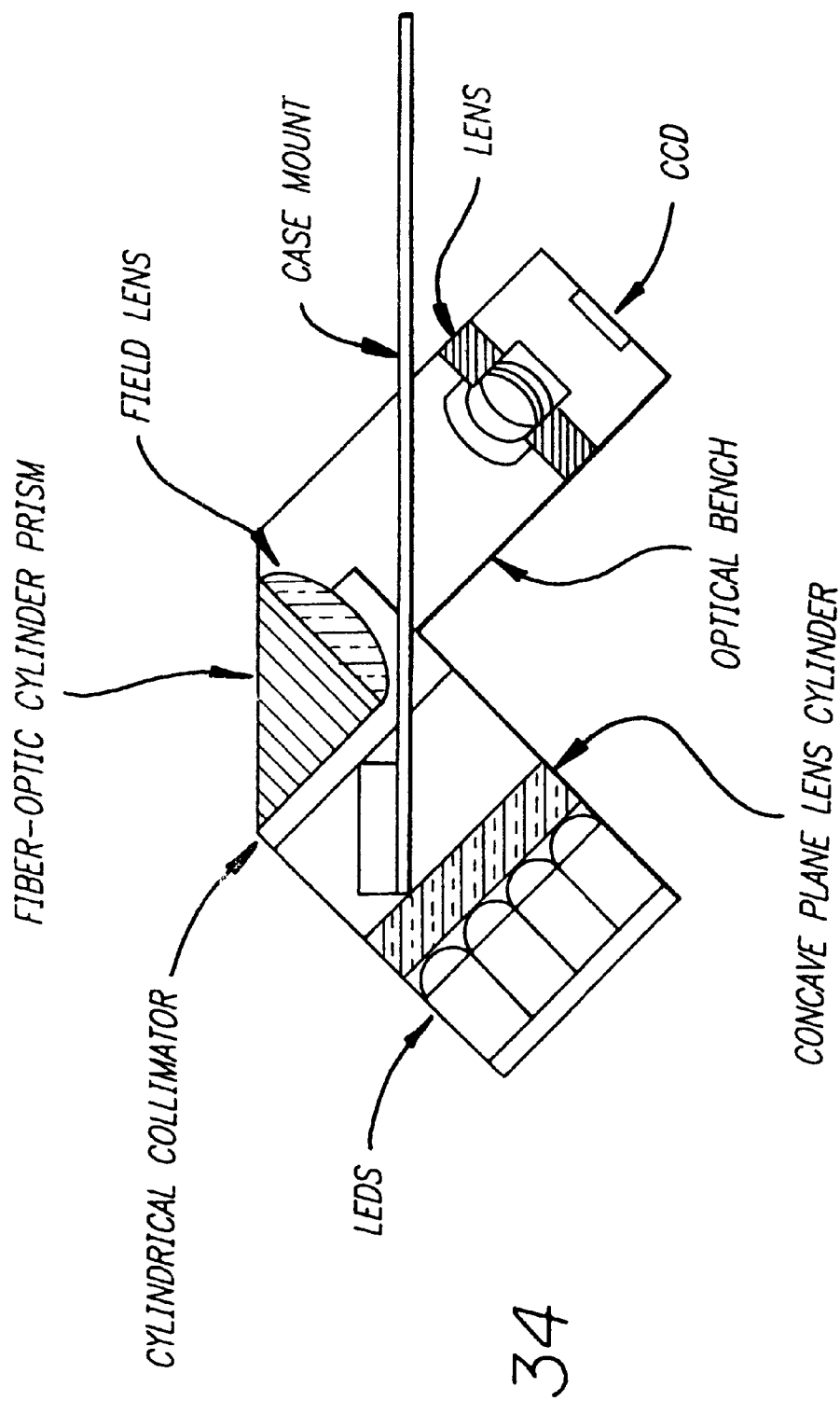

The prism is substantially flush with the top of the case, and essentially spring-suspended in that condition (together with the rest of the optical bench) from a case mount (FIG. 34). Downward motion against the springs actuates the microswitch 501 (FIG. 6).

8. ELECTRONICS

Figure 6:
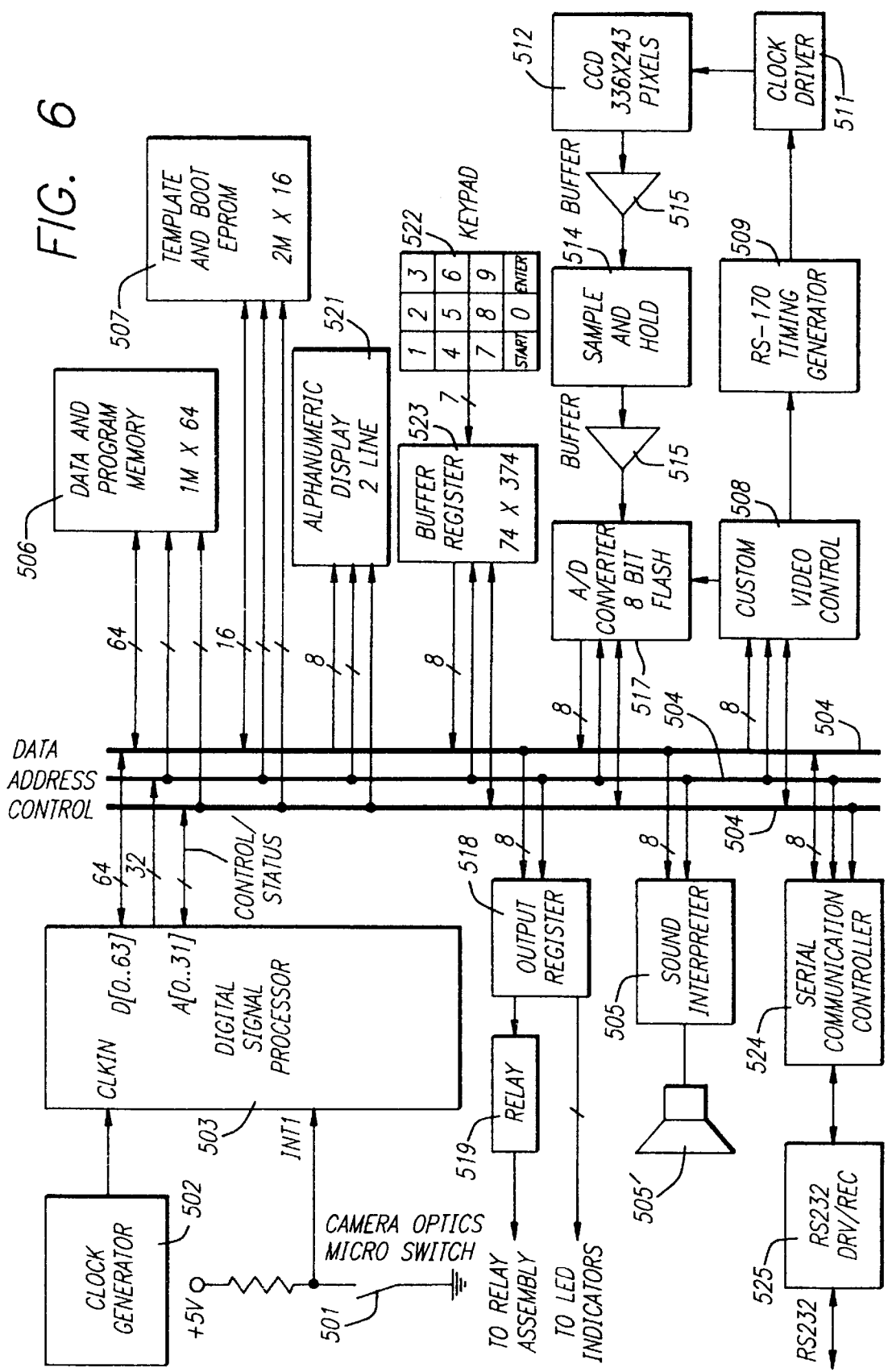
FIG. 6 is an electronics block diagram.

Electronic details for all circuits appear in FIGS. 23 through 31, which will be self explanatory to those skilled in the art—with the exception of the video control 508 (FIG. 6). That unit, as previously mentioned, is a custom-programmed logic circuit—or programmable logic device (PLD).

The PLD in use is known by its model or designator number C80, and is operated using so-called "glue" logic. Understanding its customized internal operation requires an operational description, which is provided here. The acronyms and other specialized terminology will be clear to those skilled in the art:

C80 MEMORY SYSTEM
Jun. 23, 1996.

| Ram Used | GL44016 256K × 16 EDO, 40 nS, 8 chips |
|---|---|
| Organization | 2 × 256k × 64 |
| Page size | 512 DRAM addresses; 4k bytes |
| Refresh: | 512 in 8 ms |
| Transfers: | Little-Endian |

Memory Control

/RAS0,/RAS1—decode 2 banks from C80/RAS output; only enable when DRAM address select is active. During refresh cycle, both/RAS outputs must be on. Need 5 nS PLD to gate/RAS lines Need to tristate/RAS when/DACK to allow frame grabber to take over.

C80 FRAME GRABBER
Jun. 23, 1996.
Operation

The frame grabber is implemented in a single PLD that includes a master state machine, an address counter, a DRAM address multiplexer, and a DRAM state machine.

The frame grabber takes over the 'C80 bus and directly puts data into one DRAM byte lane; the other DRAM byte lanes are left untouched. To start a frame grab, the 'C80 writes to a register bit to signal that a frame should be grabbed on the next cycle. The master state machine immediately asserts/HREQ to grab the bus, and waits for/HACK to be asserted. After/HACK has been asserted, the master state machine continues performing/CAS-/RAS refresh cyles to maintain data in the DRAM until VSYNC is asserted. Upon VSYNC, the master state machine resets the frame grabber address counter to the starting address and waits for VALID to be asserted. While waiting, the frame grabber DRAM state machine performs/CAS-/RAS refresh cycles to maintain data in the DRAM. Once VALID has been asserted, the CCD data is valid and the state machine takes a new video sample every 160 nS. The address counter is incremented after each sample. Data acquisition continues until VALID is deasserted, then/CAS-/RAS refresh cycles are performed to maintain the data. When the next/VSYNC pulse occurs,/HREQ is deasserted and the state machine is stopped.

The frame grabber state machine is synced to the CCD timing generator's 25 MHz clock.

One possible cycle by cycle DRAM state machine implementation is to assert/RAS and/WR, then change the address multiplexer, then assert/CAS, then deassert/CAS. This yields a very liberal DRAM cycle with a Tcac of 40 nS, a Trac of 80 nS and a trp of 40 nS.

The VALID signal is generated by the CCD timing generator and indicates when the CCD output is valid.

The frame grabber address counter starting address is dependant on the system memory map which has not been determined yet.

The timing generator may either be the TI CCD) timing generator or it may be part of the frame grabber PLD. Other "glue" logic may be incorporated into the frane grabber PLD, depending on PLC device logic and pin resources.

Frame Grabber PLD Control Lines:

/RAS0—RAS for address bank 0. Not asserted during data transfers, but asserted during refresh cycles.

/RAS1—RAS output for address bank 1. Asserted during data transfers and during refresh cycles.

/CAS0—/CAS output for byte lane 0. Asserted during data transfers and during refresh cycles.

/CAS1 to/CAS7. /CAS outputs for byte lanes 1 through 7. Asserted only during refresh cycles.

DRAMAD[0..8]—Multiplexed row and column address outputs to DRAM.

/VSYNC—active low input from video timing generator. Indicates start and end of frame VALID—active high input from video timing generator. Lndicates valid data from the video A/D.

/VIDEO_CONV—active low output to video A/D. Starts data conversion.

/HREQ—active low output to C80. Requests bus.

/HACQ—active low input from C80. Indicates bus has been given to the frame grabber.

CLKO—50MHz clock from C80.

CLK25—25 MHz clock output to the video timing generator; divided by two from the C80.

/DBEN—high while acquiring data—use resistor pullup on this line.

DDIR—don't care while acquiring data—use resistor pullup on this line.

It will be understood that the foregoing disclosure is intended to be merely exemplary, and not to limit the scope of the invention—which is to be determined by reference to the appended claims.

What is claimed is:

1. Apparatus for acquiring surface-relief data from a relieved surface such as a finger; said apparatus comprising:
   prism means formed from optical fibers and including:
      a first end, comprising terminations of the fibers for contact with such relieved surface, and
      a second end, comprising opposite terminations of the same or corresponding fibers, for passage of light traveling along the fibers from the first end;
   means for projecting light across the fibers in a region where the prism means satisfy at least one physical condition for efficient nonducting transillumination based upon a relationship between indices of refraction in the prism means, for lighting the first-end terminations;
   wherein a light fraction dependent on contact between such relieved surface and each illuminated first-end termination is ducted from that termination along its fiber;
   electrooptical means for receiving at the second end each light fraction from the first end, and in response forming an electrical signal characteristic of such surface relief; and
   intermediate focal means for relaying each light fraction at said second end to the electrooptical means.

2. The apparatus of claim 1, wherein:
   the electrooptical means have an image-receiving area that is smaller than the second end of the prism means; and
   the focal means form, on the image-receiving area of the electrooptical means, a reduced image of the second end of the prism means.

3. The apparatus of claim 2, wherein:
   the focal means comprise at least one lens.

4. The apparatus of claim 1, wherein:
   the focal means comprise an objective lens for imaging the second end of the prism means onto the electrooptical means.

5. The apparatus of claim 4, wherein:
   the focal means further comprise means for flattening the focal surface, and improving uniformity of illumination, at the electrooptical means.

6. The apparatus of claim 5, wherein:
   the flattening means further comprise a field lens closely adjacent to the second end of the prism means.

7. The apparatus of claim 4, wherein:
   the focal means further comprise a field lens closely adjacent to the second end of the prism means.

8. The apparatus of claim 7, wherein:
   the field lens is fixed to the second end of the prism means.

9. The apparatus of claim 7, wherein:
   the field lens is formed in the second end of the prism means.

10. The apparatus of claim 7, wherein:
    the objective focal length is roughly eight millimeters; and
    the field-lens focal length is roughly forty millimeters.

11. The apparatus of claim 4, wherein:
    the objective focal length is roughly eight millimeters; and
    the objective, prism means and electrooptical means are spaced to provide a reduction factor of roughly three.

12. A bright-field FTIR apparatus according to claim 1, wherein:
    said projecting means comprise means for projecting light to enter individual fibers, through their respective side walls, immediately adjacent to their respective terminations; and
    each termination at said first end is oriented, relative to said projected light and relative to a longitudinal direction of its fiber, so that said light at that termination is:
       reflected at that termination into and along its fiber toward the electrooptical means, if such relieved surface is out of contact with that termination, and
       in large part scattered by such relieved surface out of the corresponding fiber, if such relieved surface is in contact with that termination.

13. A dark-field FTIR apparatus according to claim 1, wherein:
    said projecting means comprise means for projecting light to enter individual fibers, through their respective side walls, immediately adjacent to their respective terminations at the first end; and
    each termination at said first end is oriented, relative to said projected light and relative to a longitudinal direction of its fiber, so that said light at that termination is:
       reflected at that termination out of its fiber, if such relieved surface is out of contact with that termination, and
       fractionally scattered by such relieved surface into and along its said fiber toward the electrooptical means, if such relieved surface is in contact with that fiber termination.

14. A dark-field FTIR apparatus according to claim 1, wherein:
the prism means comprise a fiber-optic prism having a partially reflecting surface;
said projecting means comprise means for projecting light into said prism to enter individual fibers, through their respective side walls, immediately adjacent to the partially reflecting interface;
the partially reflecting interface redirects some of the light from the projecting means to pass along said individual fibers within said prism toward their respective terminations at the first end.

15. The apparatus of claim 1, wherein said at least one physical condition comprises:
a limitation on maximum permissible numerical aperture of the prism means; and
fiber diameter that is substantially constant with respect to longitudinal position.

16. Apparatus for acquiring surface-relief data from a relieved surface such as a finger; said apparatus comprising:
prism means formed from optical fibers and including:
an optical data-input end, comprising terminations of fibers of the bundle, for contact with such relieved surface at the fiber terminations,
at least one side face for receiving light into the prism means across the fibers in a region where the prism means satisfy at least one physical condition for efficient nonducting transillumination based upon a relationship between indices of refraction in the prism means, and
a partially reflecting surface for redirecting light received through the side face to illuminate the fiber terminations at the data-input end;
means for receiving light that passes through the partially reflecting surface from the illuminated fiber terminations, and in response providing at least one signal which is characteristic of such surface relief; and
intermediate focal means for relaying light that passes through the partially reflecting surface to the receiving-and-providing means.

17. Apparatus according to claim 16, further comprising:
means for projecting light into the light-receiving face of the prism so that the light crosses part of the bundle to enter individual fibers through their respective side walls immediately adjacent to the partially reflecting surface, to be partially redirected by said surface toward the data-input end of the prism for illuminating the terminations at the data-input end of the prism.

18. Dark-field FTIR apparatus according to claim 16, wherein:
light reaching each data-input-end termination, depending on contact between that termination and such relieved surface, can be at least fractionally passed from that termination back into and along the corresponding fiber; and
light fractionally passed back into and along said corresponding fiber passes fractionally through the partially reflecting interface and the second optical element to the light-receiving means; and further comprising:
an optical element formed from another bundle of optical fibers, secured to the prism along the partially reflecting surface and including an optical data-output end for passage of light traveling along the fibers from the data-input end and through the partially reflecting interface to the light-receiving means.

19. The apparatus of claim 16, wherein said at least one physical condition comprises:
a limitation on maximum permissible numerical aperture of the prism means; and
fiber diameter that is substantially constant with respect to longitudinal position.

20. Apparatus for acquiring surface-relief data from a relieved surface such as a finger; said apparatus comprising:
prism means formed from optical fibers and including:
a first end, comprising terminations of the fibers for contact with such relieved surface, and
a second end, comprising opposite terminations of the same or corresponding fibers, for passage of light traveling along the fibers from the first end;
means for projecting light across the fibers for lighting the first-end terminations;
wherein a light fraction dependent on contact between such relieved surface and each illuminated first-end termination is ducted from that termination along its fiber; and
electrooptical means for receiving at the second end each light fraction from the first end, and in response forming an electrical signal characteristic of such surface relief; and
intermediate focal means for relaying each light fraction at said second end to the electrooptical means;
wherein the prism means, at least in a region where the light crosses the fibers, have a numerical aperture that does not exceed $$2n_{avg}(D/x_F)^{1/4},$$

where
$n_{avg}$=average of core and cladding refractive indices in said region of the prism means;
D=periodicity of the fiber structure in said region; and
$x_F$=illumination-path distance in said region;
said illumination-path distance being measured across the prism means if the apparatus is illuminated through one said side face, and being measured to the midplane of the prism means if the apparatus is illuminated through more than one said side face.

21. Apparatus for acquiring surface-relief data from a relieved surface such as a finger; said apparatus comprising:
prism means formed from optical fibers and including:
a first end, comprising terminations of the fibers for contact with such relieved surface, and
a second end, comprising opposite terminations of the same or corresponding fibers, for passage of light traveling along the fibers from the first end;
means for projecting light across the fibers for lighting the first-end terminations;
wherein a light fraction dependent on contact between such relieved surface and each illuminated first-end termination is ducted from that termination along its fiber; and
electrooptical means for receiving at the second end each light fraction from the first end, and in response forming an electrical signal characteristic of such surface relief; and
intermediate focal means for relaying each light fraction at said second end to the electrooptical means;
wherein the prism means, at least where the light crosses the fibers, have a numerical aperture that does not exceed one-half.

22. Apparatus for acquiring surface-relief data from a relieved surface such as a finger; said apparatus comprising:
- prism means formed from optical fibers and including:
  - a first end, comprising terminations of the fibers for contact with such relieved surface, and
  - a second end, comprising opposite terminations of the same or corresponding fibers, for passage of light traveling along the fibers from the first end;
- means for projecting light across the fibers for lighting the first-end terminations;
- wherein a light fraction dependent on contact between such relieved surface and each illuminated first-end termination is ducted from that termination along its fiber; and
- electrooptical means for receiving at the second end each light fraction from the first end, and in response forming an electrical signal characteristic of such surface relief; and
- intermediate focal means for relaying each light fraction at said second end to the electrooptical means and
- wherein the prism means, at least in a region where the light crosses the fibers, have a numerical aperture that does not exceed $$2n_{avg}(D/2x_F)^{1/4},$$

where
- $n_{avg}$=average of core and cladding refractive indices in said region of the prism means;
- D=periodicity of the fiber structure in said region; and
- $x_F$=illumination-path distance in said region;

said illumination-path distance being measured across the prism means if the apparatus is illuminated through one said side face, and being measured to the midplane of the prism means if the apparatus is illuminated through more than one said side face.

23. Apparatus for acquiring surface-relief data from a relieved surface such as a finger; said apparatus comprising:
- prism means formed from optical fibers and including:
  - a first end, comprising terminations of the fibers for contact with such relieved surface, and
  - a second end, comprising opposite terminations of the same or corresponding fibers, for passage of light traveling along the fibers from the first end;
- means for projecting light across the fibers for lighting the first-end terminations;
- wherein a light fraction dependent on contact between such relieved surface and each illuminated first-end termination is ducted from that termination along its fiber; and
- electrooptical means for receiving at the second end each light fraction from the first end, and in response forming an electrical signal characteristic of such surface relief; and
- intermediate focal means for relaying each light fraction at said second end to the electrooptical means;
- wherein the prism means, at least where the light crosses the fibers, have a numerical aperture that does not exceed 0.42.

24. Apparatus for acquiring and using surface-relief data, from a relieved surface such as a finger, for controlling access to facilities, equipment, a financial service or information; said apparatus comprising:
- prism means formed from optical fibers and including:
  - a first end, comprising terminations of the fibers for contact with such relieved surface, and
  - a second end, comprising opposite terminations of the same or corresponding fibers, for passage of light traveling along the fibers from the first end;
- means for projecting light across the fibers in a region where the prism means satisfy at least one physical condition for efficient nonducting transillumination based upon a relationship between indices of refraction in the prism means, for lighting the first-end terminations;
- wherein a light fraction dependent on contact between such relieved surface and each illuminated first-end termination is ducted from that termination along its fiber;
- electrooptical means for receiving at the second end each light fraction from the first end, and for processing the received light to determine identity of the relieved surface, and for applying the determined identity to control access to such facilities, equipment, financial service or information; and
- intermediate focal means for relaying each light fraction at said second end to the electrooptical means.

25. The apparatus of claim 24, wherein said at least one physical condition comprises:
- a limitation on maximum permissible numerical aperture of the prism means; and
- fiber diameter that is substantially constant with respect to longitudinal position.

26. A secured system subject to access control based upon surface-relief data from a relieved surface such as a finger; said system comprising:
- utilization means, susceptible to misuse in the absence of a particular such relieved surface that is related to an authorized user, said utilization means being selected from the group consisting of:
  - a facility,
  - apparatus,
  - means for providing a financial service, and
  - means for providing information;
- prism means formed from optical fibers and including:
  - a first end, comprising terminations of the fibers for contact with such relieved surface, and
  - a second end, comprising opposite terminations of the same or corresponding fibers, for passage of light traveling along the fibers from the first end;
- means for projecting light across the fibers in a region where the prism means satisfy at least one physical condition for efficient nonducting transillumination based upon a relationship between indices of refraction in the prism means, for lighting the first-end terminations;
- wherein a light fraction dependent on contact between such relieved surface and each illuminated first-end termination is ducted from that termination along its fiber;
- electrooptical means for receiving at the second end each light fraction from the first end, and for processing the received light to determine identity of the relieved surface, and for applying the determined identity to control access to the utilization means and
- intermediate focal means for relaying each light fraction at said second end to the electrooptical means.

27. The apparatus of claim 26, wherein said at least one physical condition comprises:
- a limitation on maximum permissible numerical aperture of the prism means; and fiber diameter that is substantially constant with respect to longitudinal position.

28. Self-contained apparatus for skin-pattern verification, comprising:

a case having volume less than about two liters (one hundred twenty cubic inches), and having mounted within or for access at the surface of the case all the following elements;

means for holding an electrical-energy storage device or for receiving electrical power from an external source, to power the apparatus;

means for contacting a skin pattern to develop an electronic data array corresponding to an image of the skin pattern;

means for generating in response a corresponding electronic data array for use in verification;

means for performing a verification procedure;

output means for indicating or effectuating, or both, a verification decision;

means for formatting the data array in a compact form for use in storage, import or export; and means for converting the data array from said compact form to a different form for use by the verification-procedure performing means.

29. The self-contained skin-pattern-verification apparatus of claim 28, wherein:

the case volume is less than about 1.4 liter (eighty cubic inches).

30. The apparatus of claim 28, further comprising:

means for transmitting skin-pattern image data in said compact form to or from the apparatus.

31. The self-contained skin-pattern-verification apparatus of claim 28, wherein:

said formatting means comprise means for level-downsampling the data to develop said compact form.

32. The self-contained skin-pattern-verification apparatus of claim 31, wherein:

said formatting means comprise means for mapping the data into two- or single-bit data to serve as said compact form.

33. The self-contained skin-pattern-verification apparatus of claim 32, wherein:

said converting means comprise means for placing data in at least one format selected from the group consisting of:
multilevel data,
data expressed in terms of sinusoids, and
data expressed in terms of Fourier transforms, to serve as said data array for use in verification.

34. The self-contained skin-pattern-verification apparatus of claim 28, wherein:

said converting means comprise means for developing data in at least one format selected from the group consisting of:
multilevel data,
data expressed in terms of sinusoids, and
data expressed in terms of Fourier transforms, to serve as said data array for use in verification.

35. The self-contained skin-pattern-verification apparatus of claim 28, wherein the fingertip-contacting means comprise:

prism means formed from optical fibers; and
electrooptical means for receiving light through said optical fibers and in response forming an electrical signal characteristic of such contacted fingertip.

36. The self-contained skin-pattern-verification apparatus of claim 35, wherein:

the fingertip-contacting means comprise means for cross-lighting the fibers in a region where fiber diameter is substantially constant with respect to longitudinal position.

37. The self-contained skin-pattern-verification apparatus of claim 36, further comprising:

intermediate focal means for relaying light from the prism means to the electrooptical means.

38. The self-contained apparatus of claim 28, wherein:

the performing means comprise means, wholly within the case of said self-contained apparatus, for carrying out said verification procedure wholly within the case of said self-contained apparatus as distinguished from:
transmission of a data array to a remote apparatus to be processed and then
receipt of decision data from a remote apparatus after processing.

39. The self-contained apparatus of claim 38, wherein:

the carrying-out means comprise means for directly quantifying and manipulating internal characteristics of the data array that are directly related to fingerprint information expressed within the data array, to derive all of said verification decision, as distinguished from data encoding for transmission to a remote apparatus; and the indicating or effectuating means comprise means for performing said indicating or effectuating of said verification decision derived substantially wholly within the case.

40. Self-contained apparatus for skin-pattern verification, comprising:

a case having volume less than about two liters (one hundred twenty cubic inches), and having mounted within or for access at the surface of the case all the following elements;

means for holding an electrical-energy storage device or for receiving electrical power from an external source, to power the apparatus;

means, including an imaging unit and a sensor array disposed to receive an image therefrom, for contacting a skin pattern to develop an electronic data array corresponding to an image of the skin pattern;

a video controller for controlling the sensor array to develop said electronic data array;

an analog-to-digital converter for digitizing the electronic data array;

a digital signal processor for performing verification procedures based upon the electronic data array, and for developing a decision signal based upon the verification procedures;

memory means for holding an authorized-user skin-pattern template, program firmware for the digital signal processor, and data used in the verification procedures;

an output register for holding the decision signal;

output means for transmitting a utilization-means switching signal, based on the decision signal, from the apparatus for effectuation of the decision signal; and a control, address, and data bus interconnecting the video controller, analog-to-digital converter, video processor, memory means, and output register.

41. The self-contained skin-pattern-verification apparatus of claim 40, wherein:

the video controller comprises a programmable logic circuit that is custom-programmed for the apparatus.

42. The self-contained skin-pattern-verification apparatus of claim 41, wherein:

the digital signal processor in operation draws more than ten watts of electrical power, and has a characteristic of generating and radiating significant electromagnetic interference within the case;

the holding or receiving means comprise means for converting input voltage to other voltages used in the apparatus, said converting means having the characteristic of generating and radiating extremely significant electromagnetic interference within the case;

the video controller controls the sensor array to read data therefrom at a multiple-megahertz data rate;

whereby noise filtering is necessarily limited, the video controller is sensitive to radiated electromagnetic interference, and the sensor array is extremely sensitive to radiated electromagnetic interference; and all of said elements are mounted together on a common circuit board that has a generally rectangular shape, and wherein:

the sensor and related circuitry are disposed in one corner of the circuit board, the video controller and related circuitry are disposed near a second corner of the circuit board, the converting means are disposed in a third corner of the circuit board, said third corner being diagonally opposite from the first corner, and being generally across the board from the second corner, and the digital signal processor is disposed between the second and third corners of the board.

43. The apparatus of claim 42, wherein:

the imaging unit is an optical imaging unit; and the sensor array receives an optical image from the optical imaging unit and in response generates a high-impedance signal at said multiple-megahertz data rate.

44. The self-contained skin-pattern-verification apparatus of claim 43, wherein:

the optical imaging unit comprises prism means formed from optical fibers; and the sensor array comprises electrooptical means for receiving light through said optical fibers and in response forming said high-impedance electrical signal, characteristic of such contacted fingertip.

45. The self-contained skin-pattern-verification apparatus of claim 44, wherein:

the optical imaging unit comprises means for crosslighting the fibers in a region where fiber diameter is substantially constant with respect to longitudinal position.

46. The self-contained skin-pattern-verification apparatus of claim 45, wherein:

the optical imaging unit further comprises intermediate focal means for relaying light from the prism means to the electrooptical means.

47. The self-contained skin-pattern-verification apparatus of claim 40, further comprising:

a keypad; and a buffer register transmitting signals from the keypad to the bus.

48. The self-contained skin-pattern-verification apparatus of claim 40, further comprising:

an alphanumeric display module connected to receive signals from the bus.

49. The self-contained skin-pattern-verification apparatus of claim 40, further comprising:

indicator lights or acoustic annunciator means, or both, for indicating system status information such as the decision signal.

50. The apparatus of claim 40, wherein:

the sensor array is an integrating device;

integration time for the sensor array is settable;

the digital signal processor comprises means for automatically monitoring contrast, as represented in the electronic data array, and in response to the monitored contrast automatically adjusting the settable integration time to optimize effective contrast.

51. The self-contained apparatus of claim 40, wherein:

the digital signal processor comprises means, wholly within the case and within the digital signal processor, for carrying out all of said verification procedures by analyzing, wholly within the case, said electronic data array; and the carrying-out means comprise means for carrying out all of said analyzing by directly quantifying and manipulating internal characteristics of the data array that are directly related to fingerprint information expressed within the data array.

52. Self-contained apparatus for skin-pattern verification, comprising:

a case having volume less than about two liters (one hundred twenty cubic inches), and having mounted within or for access at the surface of the case all the following elements;

means for holding an electrical-energy storage device or for receiving electrical power from an external source, to power the apparatus;

an optical bench disposed within or forming part of, or both, the case; said bench having:

mounting bosses for optical-fiber prism means, a mounting ring for an objective lens, and a mounting pocket for a sensor array;

optical-fiber prism means mounted to the optical-bench bosses for contacting a skin pattern to develop an image thereof;

an objective lens mounted to the optical-bench ring for relaying the skin-pattern image to a sensor array;

a sensor array mounted to the optical-bench pocket for receiving said image and in response developing an electronic data array corresponding to the image;

a surface-mount electronics board holding a digital signal-processing chip for analyzing the data array to verify identity corresponding to such skin pattern; and verification-decision indicating or effectuating means, or both.

53. The self-contained skin-pattern-verification apparatus of claim 52, further comprising:

associated with the optical-fiber prism means, illumination means for crosslighting the fibers in a region where fiber diameter is substantially constant with respect to longitudinal position.

54. The self-contained skin-pattern-verification apparatus of claim 53, further comprising:

intermediate focal means for relaying light from the optical-fiber prism means to the electrooptical means.

55. The self-contained skin-pattern-verification apparatus of claim 52, wherein:

the optical-fiber prism means comprise fused optical fibers having a numerical aperture less than one half.

56. The apparatus of claim 52:

wherein the optical-fiber prism means are cylindrical; and further comprising a substantially cylindrical-section cradle fixed to the mounting bosses and supporting the optical-fiber prism means.

57. The apparatus of claim 56, wherein:

the cylindrical-section cradle is a condenser lens for coupling illumination to the optical-fiber prism.

58. The apparatus of claim 57, further comprising:

illumination means also supported from the cylindrical-section cradle and condenser lens.

59. The self-contained apparatus of claim 52, wherein:

the digital signal-processing chip comprises means, wholly within the case and on said board and within the chip, for carrying out all of said analyzing by directly quantifying and manipulating internal characteristics of the data array that are directly related to fingerprint information expressed within the data array.

\* \* \* \* \*